US009367229B2

(12) United States Patent
Dowd et al.

(10) Patent No.: US 9,367,229 B2
(45) Date of Patent: Jun. 14, 2016

(54) TOUCH-ENABLED DEVICE NAVIGATION SYSTEM

(75) Inventors: Geoffrey Dowd, San Francisco, CA (US); Ethan Eismann, Oakland, CA (US); Shikhiu Ing, Brooklyn, NY (US); Christoph Moskalonek, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 195 days.

(21) Appl. No.: 13/243,953

(22) Filed: Sep. 23, 2011

(65) Prior Publication Data

US 2013/0127734 A1 May 23, 2013

Related U.S. Application Data

(60) Provisional application No. 61/473,516, filed on Apr. 8, 2011.

(51) Int. Cl.
*G06F 3/0488* (2013.01)
*G06F 3/0482* (2013.01)
*H04M 1/725* (2006.01)

(52) U.S. Cl.
CPC ............ *G06F 3/0488* (2013.01); *G06F 3/0482* (2013.01); *H04M 1/7253* (2013.01)

(58) Field of Classification Search
CPC ... G06F 3/0482; G06F 3/0488; H04M 1/7253
USPC ................................................. 345/173–178
See application file for complete search history.

(56) References Cited

U.S. PATENT DOCUMENTS

| 6,888,936 | B1 * | 5/2005 | Groen ..................... H04M 3/42 379/142.1 |
|---|---|---|---|
| 2006/0026535 | A1 * | 2/2006 | Hotelling et al. ............. 715/863 |
| 2006/0084039 | A1 | 4/2006 | Ryokai et al. |
| 2008/0036743 | A1 * | 2/2008 | Westerman et al. .......... 345/173 |
| 2009/0327213 | A1 * | 12/2009 | Choudhary ....................... 707/2 |
| 2011/0013501 | A1 * | 1/2011 | Curtis ........................... 369/100 |
| 2011/0016406 | A1 * | 1/2011 | Grosz et al. ................... 715/741 |
| 2011/0029601 | A1 | 2/2011 | Grosz et al. |
| 2011/0029884 | A1 * | 2/2011 | Grosz et al. ................... 715/739 |
| 2011/0167353 | A1 * | 7/2011 | Grosz et al. ................... 715/738 |

OTHER PUBLICATIONS

Nack, John "Feedback, Please: PSD Viewing on iPads?", retrieved from <http://blogs.adobe.com/jnack/2010/05/feedback_please_psd_viewing_on_ipads.html> on Apr. 22, 2011, (May 27, 2010), 1 page.

(Continued)

*Primary Examiner* — Alexander Eisen
*Assistant Examiner* — Chun-Nan Lin
(74) *Attorney, Agent, or Firm* — Wolfe-SBMC

(57) ABSTRACT

A touch-enabled device establishes a two-way connection with a computing device through a network. The computing device has a content authoring program stored therein. Further, the touch-enabled device displays a navigation menu. In addition, the touch-enabled device receives an input indicating a selected item from the navigation menu. The touch-enabled device sends the selected item to the computing device such that the computing device utilizes the selected item in the content authoring program. Further, the touch-enabled device receives, from the computing device, an indication that the computing device is utilizing the selected item in the content authoring program.

17 Claims, 26 Drawing Sheets

(56) References Cited

OTHER PUBLICATIONS

"Photo Keys," http://mobileairmouse.com/photokeys/, May 15, 2011.

"KeyPad for Photoshop for iPhone, iPod touch, and iPad on the iTunes App Store," http://itunes.apple.com/us/app/keypad-for-photoshop/id342878643?mt=8, May 15, 2011.

* cited by examiner

TOUCH-ENABLED DEVICE NAVIGATION SYSTEM

RELATED APPLICATIONS

This application claims priority to U.S. Provisional Patent Application No. 61/473,516, entitled "Touch-Enabled Device Navigation System," filed on Apr. 8, 2011, which is hereby incorporated by reference in its entirety.

BACKGROUND

1. Field

This disclosure generally relates to computing devices. More particularly, the disclosure relates to a touch-enabled device navigation system.

2. General Background

Graphic artists currently have computer applications that allow them to generate their creative designs. However, a large disconnect still exists between the creative process typically utilized by artists and the creative process utilized by graphic artists with a desktop computer and a mouse. In other words, the graphic artist cannot typically simulate the full effect of the creative process utilized by an artist without a computer.

SUMMARY

In one aspect of the disclosure, a computer program product is provided. The computer program product includes a computer useable medium having a computer readable program. The computer readable program when executed on a touch-enabled device causes the touch-enabled device to establish, from a touch-enabled device, a two-way connection with a computing device through a network. The computing device has a content authoring program stored therein. Further, the computer readable program when executed on the touch-enabled device causes the touch-enabled device to display, at the touch-enabled device, a navigation menu. In addition, the computer readable program when executed on the touch-enabled device causes the touch-enabled device to receive, at the touch-enabled device, an input indicating a selected item from the navigation menu. The computer readable program when executed on the touch-enabled device causes the touch-enabled device to receive, at the touch-enabled device, an input indicating a selected item from the navigation menu. Further, the computer readable program when executed on the touch-enabled device causes the touch-enabled device to send, from the touch-enabled device, the selected item to the computing device such that the computing device utilizes the selected item in the content authoring program. In addition, the computer readable program when executed on the touch-enabled device causes the touch-enabled device to receive, at the touch-enabled device from the computing device, an indication that the computing device is utilizing the selected item in the content authoring program.

In another aspect of the disclosure, a process is provided. The process establishes, from a touch-enabled device, a two-way connection with a computing device through a network. The computing device has a content authoring program stored therein. Further, the process displays, at the touch-enabled device, a navigation menu. In addition, the process receives, at the touch-enabled device, an input indicating a selected item from the navigation menu. The process also sends, from the touch-enabled device, the selected item to the computing device such that the computing device utilizes the selected item in the content authoring program. Further, the process receives, at the touch-enabled device from the computing device, an indication that the computing device is utilizing the selected item in the content authoring program.

In yet another aspect of the disclosure, a system is provided. The system includes an establishment module that establishes, from a touch-enabled device, a two-way connection with a computing device through a network. The computing device has a content authoring program stored therein. Further, the system includes a graphical user interface that displays, at the touch-enabled device, a navigation menu. In addition, the system includes an input module that receives, at the touch-enabled device, an input indicating a selected item from the navigation menu. The system also includes a transmission module that sends, from the touch-enabled device, the selected item to the computing device such that the computing device utilizes the selected item in the content authoring program. Further, the system includes a reception module that receives, at the touch-enabled device from the computing device, an indication that the computing device is utilizing the selected item in the content authoring program.

BRIEF DESCRIPTION OF THE DRAWINGS

The above-mentioned features of the present disclosure will become more apparent with reference to the following description taken in conjunction with the accompanying drawings wherein like reference numerals denote like elements and in which:

FIG. 4A illustrates a plurality of tools that may be displayed for the user in the first device GUI.

FIG. 4B illustrates the plurality of tools displayed in FIG. 4A with one or more tool groupings.

FIG. 4C illustrates an example of an invocation of a menu bar command.

FIG. 4D illustrates a tap on the status bar or anywhere above the top row of tool icons invoking a menu bar.

FIG. 4E illustrates an alternative display to that seen in FIG. 4C and FIG. 4D.

FIG. 4F illustrates the display seen in FIG. 4E with a search interface that allows a user to search through available tools.

FIG. 4G illustrates an example of the display screen in FIG. 4E in which a tap input is received to select a menu item for insertion into a selected empty space.

FIG. 4H illustrates an example of the display screen in FIG. 4E in which reordering is performed by dragging and dropping.

FIG. 4I illustrates non-contiguous tool management of the tool icons in the first device GUI.

FIG. 4J illustrates an example of a delete operation performed in the first device GUI.

FIG. 4K illustrates an example of a dialog box that is displayed in response to a user attempting to add an additional tool bar over the maximum.

FIG. 4L illustrates an example of a pull down gesture on a menu list in the first device GUI.

FIG. 4M illustrates a virtual keyboard that may be utilized to interact with the search interface.

FIG. 5A illustrates a plurality of documents, e.g., images, that may be displayed for the user in the first device GUI.

FIG. 5B illustrates an example in which two open documents are displayed.

FIG. 5C illustrates an example in which the user provides tap touch gestures over information icons.

FIG. 5D illustrates the tapped tiles displaying corresponding information.

FIG. 5E illustrates a document that is selected for zooming.

FIG. 5F illustrates duplication of an open document.

FIG. 5H illustrates a reordering of the documents in the first device GUI.

DETAILED DESCRIPTION

A computer program may be stored on a touch-enabled device, e.g., a tablet device, as a companion application that communicates with a computing device, e.g., a desktop computer, having a content authoring program over a network. The content authoring program may be any program utilized to author or modify content, e.g., a graphics program such as a photo editing program or a drawing program, a presentation program, a word processing program, a spreadsheet program, or the like. A user may control certain aspects of the content authoring program from the touch-enabled device. As examples, the user may control the foreground color, background color, and toolbar tools displayed in the display operably connected to a desktop computer by providing commands to the tablet device. The user may also select images for display in the content authoring program in the desktop computer by utilizing the tablet device to navigate through images for selection.

Figure 1:
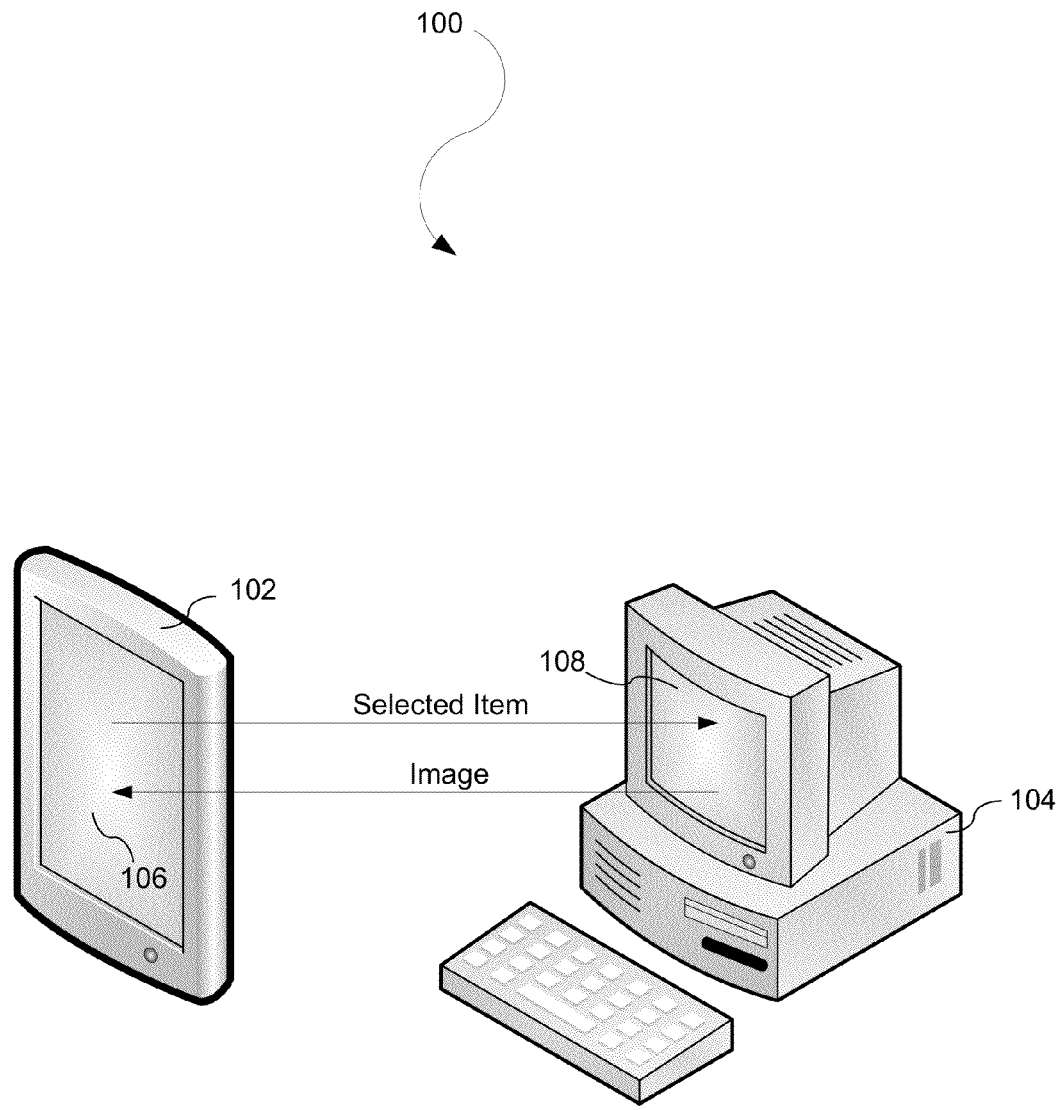
FIG. 1 illustrates a remote touch-enabled navigation system.

FIG. 1 illustrates a remote touch-enabled navigation system 100. As an example, the remote touch-enabled navigation system 100 may have a first device 102 such as a touch enabled tablet device and a second device 104 such as a desktop computer. A variety of computing devices may be utilized for either of these devices. For example, the first device may also be a touch-enabled cell phone, smart phone, touch-enabled laptop, or the like and the second device may also be a set top box, laptop, tablet device, cell phone, smart phone, or the like.

In one embodiment, the first device 102 communicates with the second device 104 through a network. The network may be a wireless network, home network, local area network, wide area network, the Internet, or the like. Alternatively, the network may be connected through a wireline connection. In yet another alternative configuration, the first device 102 may communicate directly with the second device 104 directly through a wireline connection, infrared signals, radio frequency signals, or the like. In one embodiment, a server is utilized to receive data from the first device 102. The server may be a separate device or the second device 104 itself. The first device 102 may have a processor that operates code to establish a network connection with the server. In one embodiment, the second device 104 may open a specific networking port to become a server. The server may advertise itself with a networking configuration. The first device 102 then acts as a client to request a connection with that information by specifying the internet protocol ("IP") address or hostname of the server. After being connected, the server waits for code containing commands, e.g., scripts. The server then sends these commands to a content authoring program in the second device 104, which evaluates the data. The second device 104 then evaluates the command and sends the command to the content authoring program so that the content authoring program may execute the command received from the first device 102. As an example, the command may be a request to change a toolbar color in the content authoring program stored in the second device 104. A variety of other commands may be utilized.

In an alternative embodiment, the user may provide inputs on the second device 104 to be sent to the first device 102. As an example, a user may like want to establish certain parameters for the first device 102 by typing inputs for those parameters. Accordingly, data and commands may also be sent from the second device 104 to the first device 102. In that instance, the second device 104 will act as a client and the first device 102 or another intermediary device will act as the server to the second device 104.

In yet another alternative embodiment, both the first device 102 and the second device 104 may send data and provide commands to each other. As an example, the devices may communicate through a peer-to-peer network.

Figure 2:
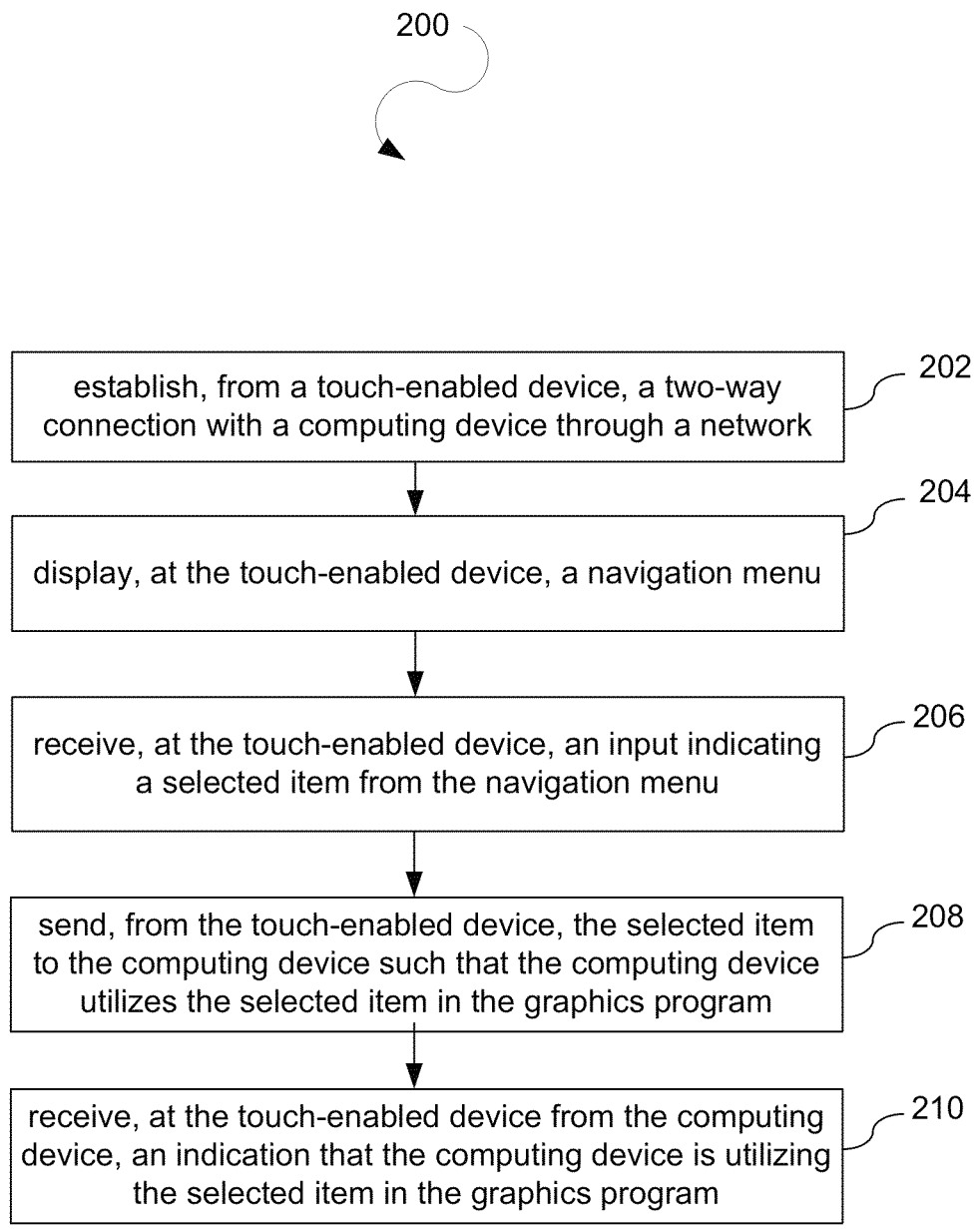
FIG. 2 illustrates a process utilized by the first device to communicate with the second device illustrated in FIG. 1.

FIG. 2 illustrates a process 200 utilized by the first device 102 to communicate with the second device 104 illustrated in FIG. 1. At a process block 202, the process 200 establishes, from a touch-enabled device, a two-way connection with a computing device through a network. The computing device has a content authoring program stored therein. Further, at a process block 204, the process 200 displays, at the touch-enabled device, a navigation menu. In addition, at a process block 206, the process 200 receives, at the touch-enabled device, an input indicating a selected item from the navigation menu. At a process block 208, the process 200 also sends, from the touch-enabled device, the selected item to the computing device such that the computing device utilizes the selected item in the content authoring program. Further, at a process block 210, the process 200 receives, at the touch-enabled device from the computing device, an indication that the computing device is utilizing the selected item in the content authoring program.

Figure 3A:
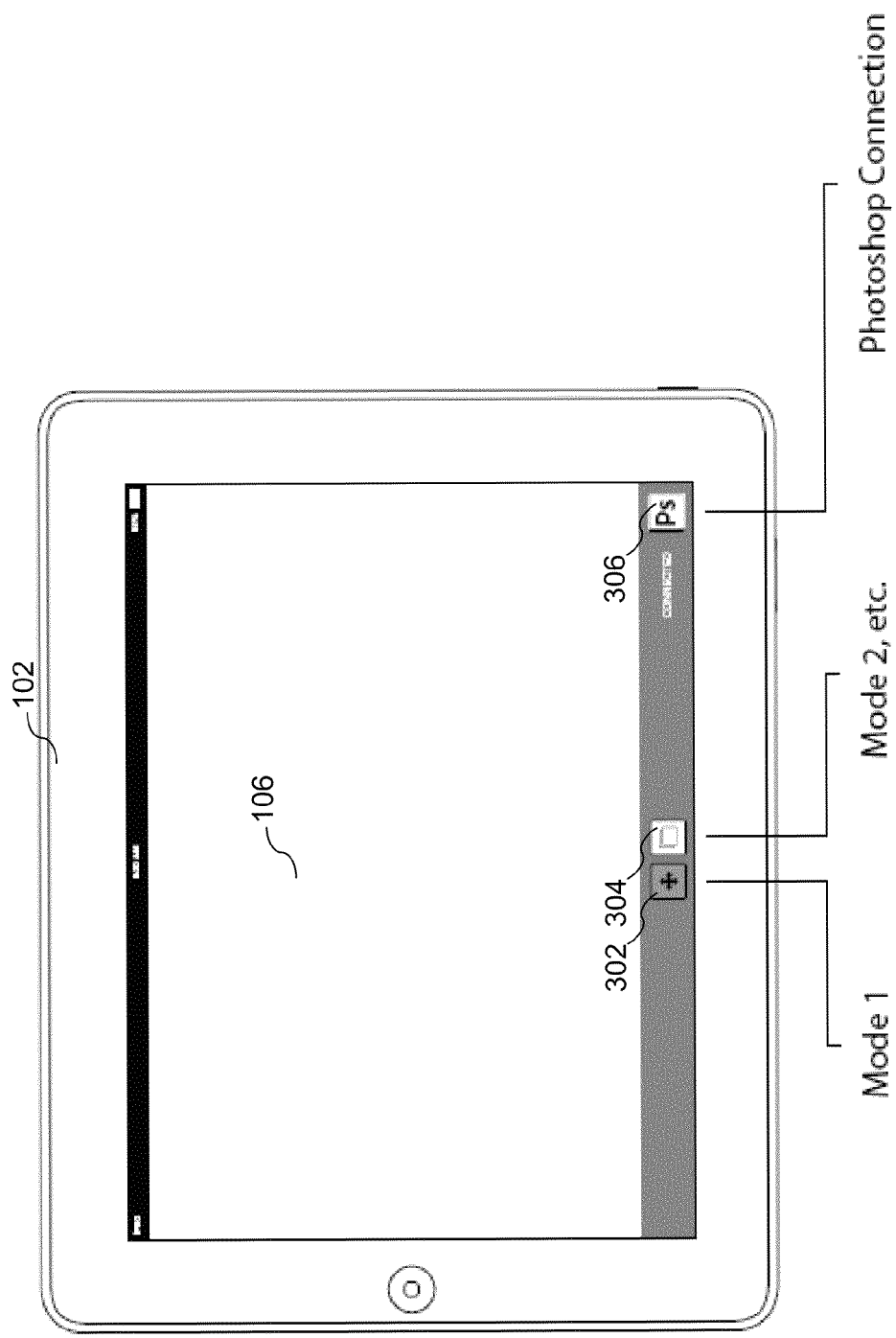
FIG. 3A illustrates an expanded view of the first device.

FIG. 3A illustrates an expanded view of the first device 102. The first device 102 may have a variety of different modes such as a first mode 302 and a second mode 304. Further, the first device 102 may have connection indicium 306 that indicates if the first device is connected to the second device 104. As an example, the connection indicium 306 may be a Photoshop Connection indicator that indicates that the first device 102 is connected to the second device 104, which is executing the content authoring program Adobe Photoshop® from Adobe Systems Incorporated of San Jose, Calif. A user may create a custom collection of Photoshop tools by interacting with the first device GUI 106. The first device 102 may then send the collection of Photoshop tools to the second device 104 so that the second device 104 may update its Photoshop tool collection. Accordingly, the user is provided with a more natural approach to selecting tools for content authoring programs. For example, the user may utilize a tablet device to move around a room, collaborate with others, etc. to have an artistic feel in the creative process of interacting with the content authoring program on a desktop computer. The graphics artist does not have to feel constrained to sitting in front of a desktop computer for the entire creative process.

Figure 3B:
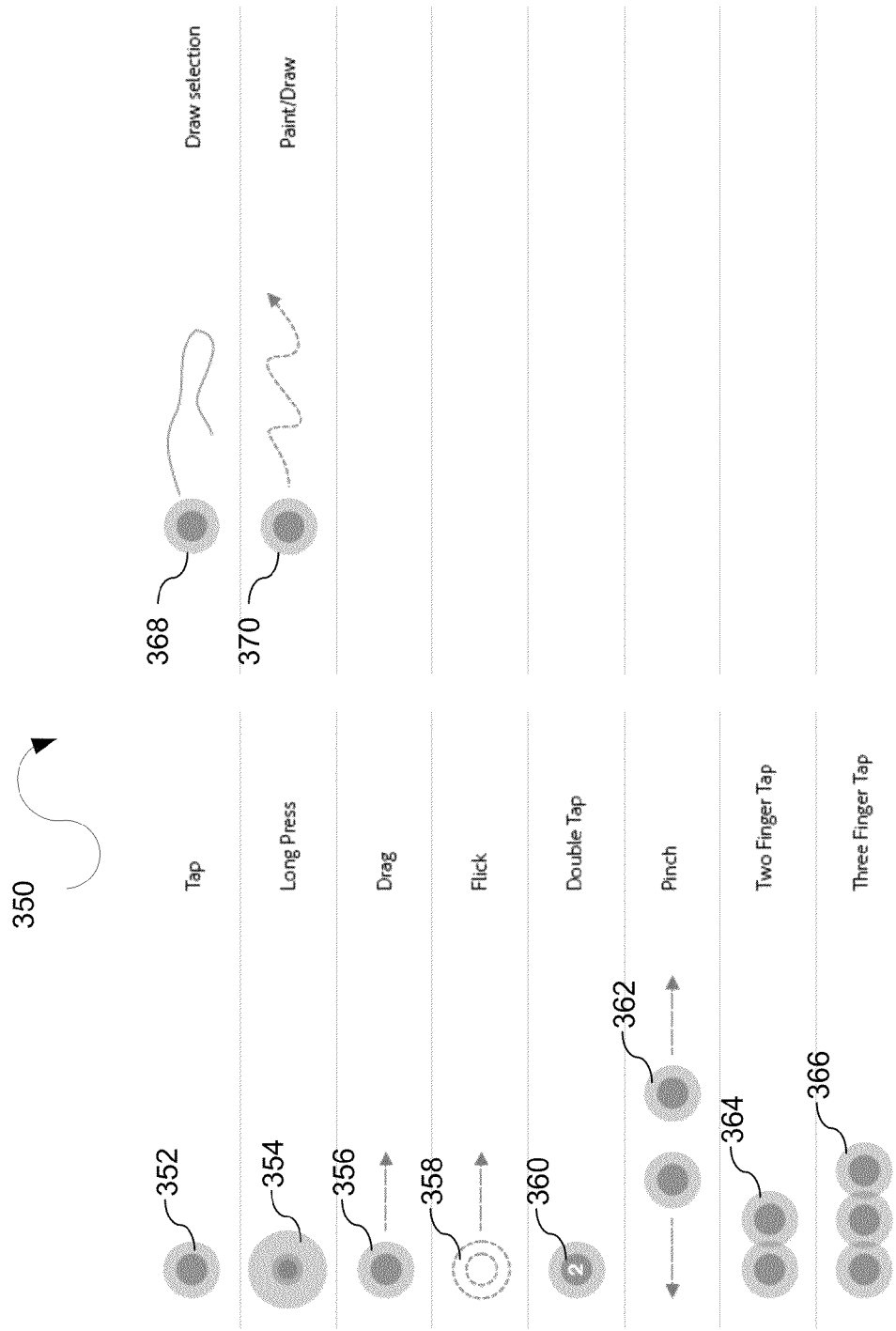
FIG. 3B illustrates a list of example touch gestures.

A variety of touch gestures may be utilized with the devices described herein. FIG. 3B illustrates a list of example touch gestures. As examples, certain touch gestures are provided for tap 352, long press 354, drag 356, flick 358, double tap 360, pinch 362, two finger tap 364, three finger tap 366, draw selection 368, and paint/draw 370. This list is not exhaustive as different and/or additional touch gestures may be utilized.

As a two-way connection between the first device 102 and the second device 104 is established, the user may also obtain image files from the second device 104 on the first device 102. The user can view, zoom, edit, and/or perform a variety of functions on image files at the first device 102. In one embodiment, the first device 102 caches the result obtained from the second device 104 such that the first device 102 retains the result if the two-way connection is disconnected. In other words, a user may move the first device 102 out of range of a wireless network and still perform functions on the files the first device 102 received from the second device 104. If the user has updated the files or changed the view, the update or change in view is transmitted from the first device 102 to the second device 104 after the user moves the first device 102 back into range of the wireless network. Further, if the files have been updated or a view has changed on the second device 104 during the disconnection, the view or update may be sent from the second device 104 to the first device 102 after the two-way connection is reestablished.

Figure 4A:
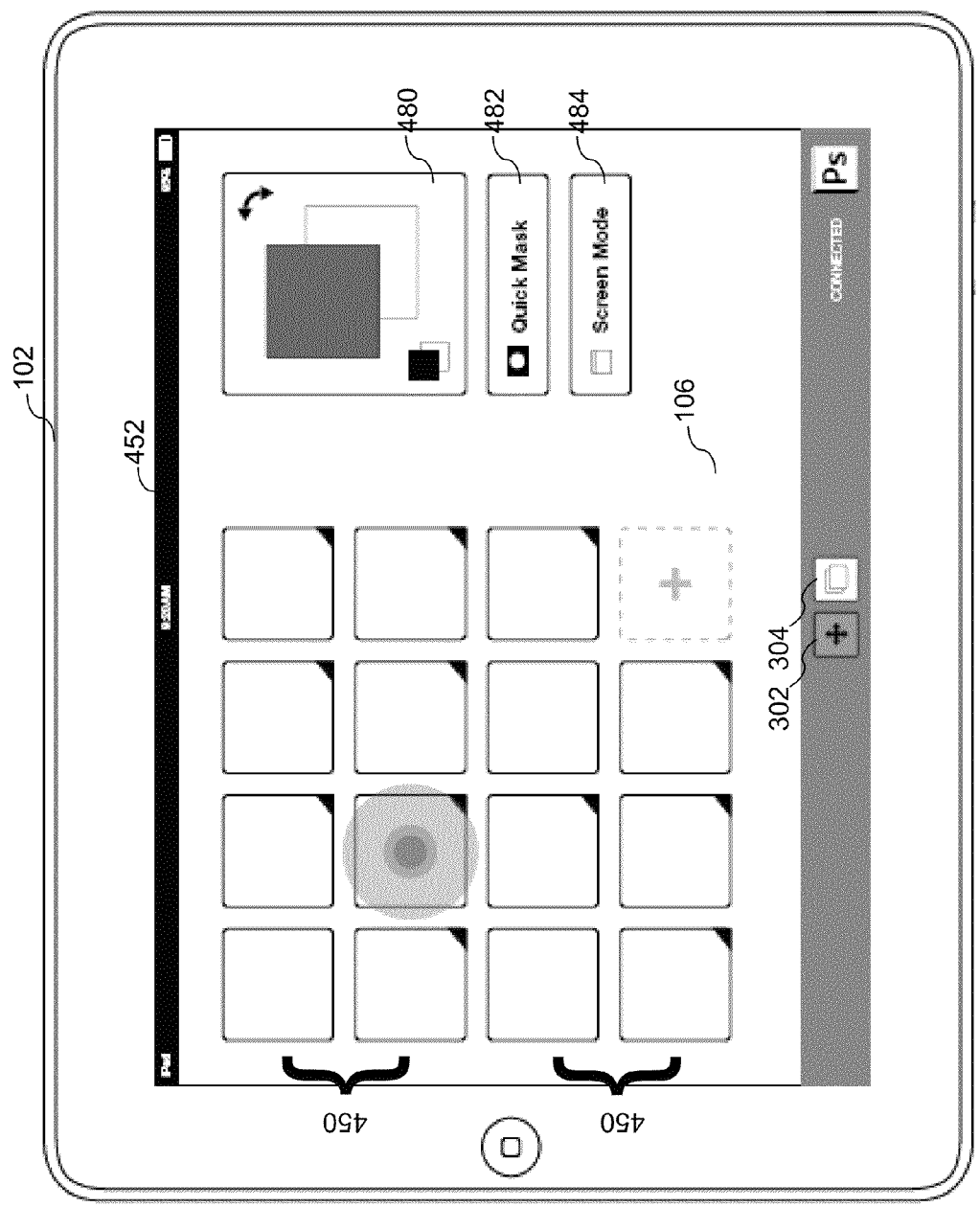
FIGS. 4A-4M illustrate example displays in the first device graphical user interface ("GUI") of tools.

FIGS. 4A-4M illustrate example displays in the first device GUI 106 of tools. The user is provided with the ability to customize tool sets on the first device 102 that may then be utilized for content authoring on the second device 104. Accordingly, the user has the creative flexibility to remotely customize tools. As an example, a user may want to customize his or her tool set during a collaboration session away from his or her desktop computer. FIG. 4A illustrates a plurality of tools 450 that may be displayed for the user in the first GUI 106. The plurality of tools may be predetermined, but customizable by the user. Further, one or more blank tools may be provided so that the user may look through tool menus to customize the one or more blank tools. As examples of special controls, a color control 480, a quick mask control 482, and a screen mode control 484 are displayed. A gesture such as a long press may be utilized to reveal a tool group, e.g., a tool group may be two or more related tools such as selection tools. A status bar 452 may be utilized to provide status indications of the first device GUI 106. The status bar 452 may also be utilized for interaction between a user and the first device GUI 106.

Figure 4B:
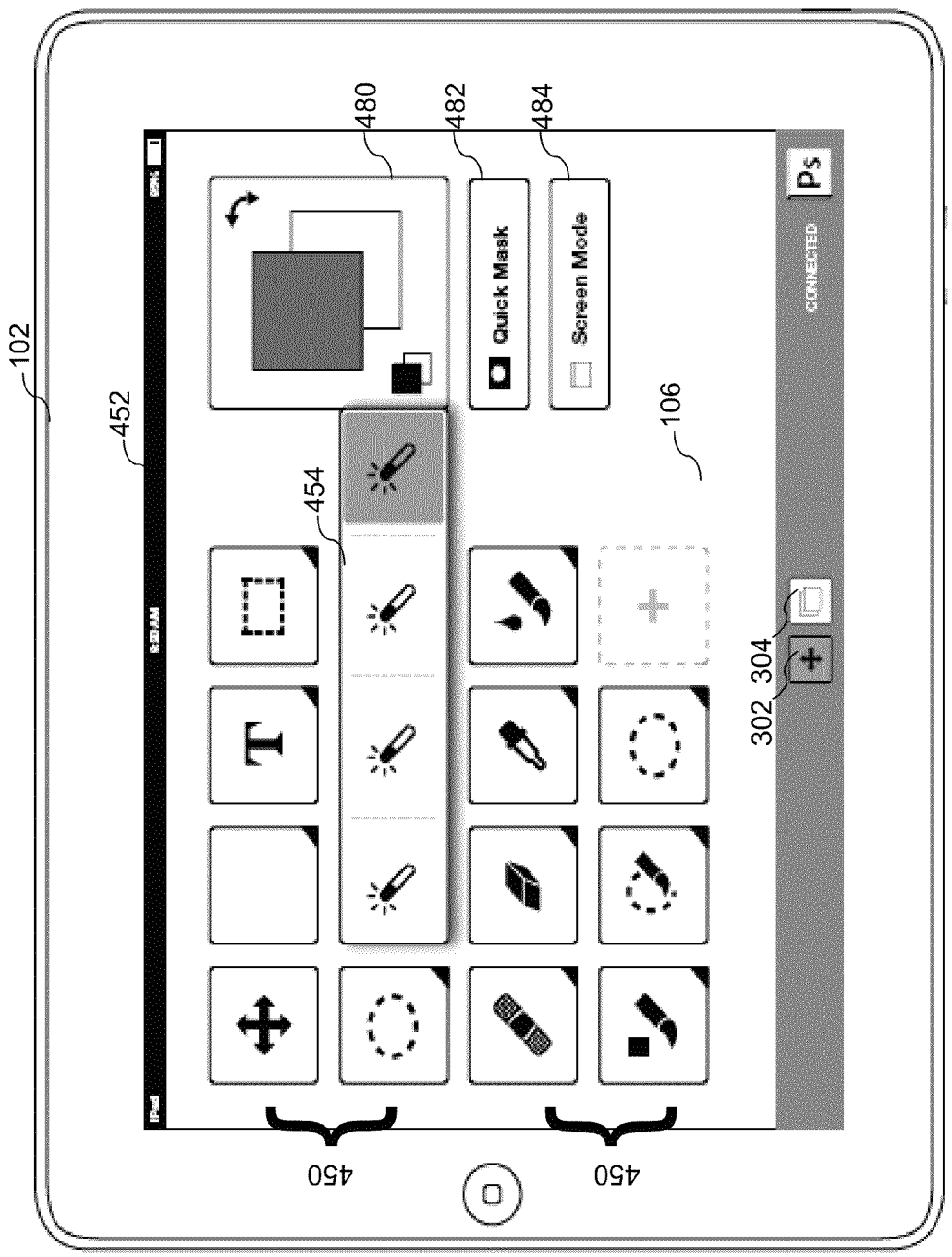

FIG. 4B illustrates the plurality of tools displayed in FIG. 4A with one or more tool groupings. In one embodiment, a long press and drag gesture expands a tool grouping 454. In another embodiment, a double tap gesture may be utilized to invoke tool groupings. A variety of other gestures may be utilized to invoke tool groupings.

Figure 4C:
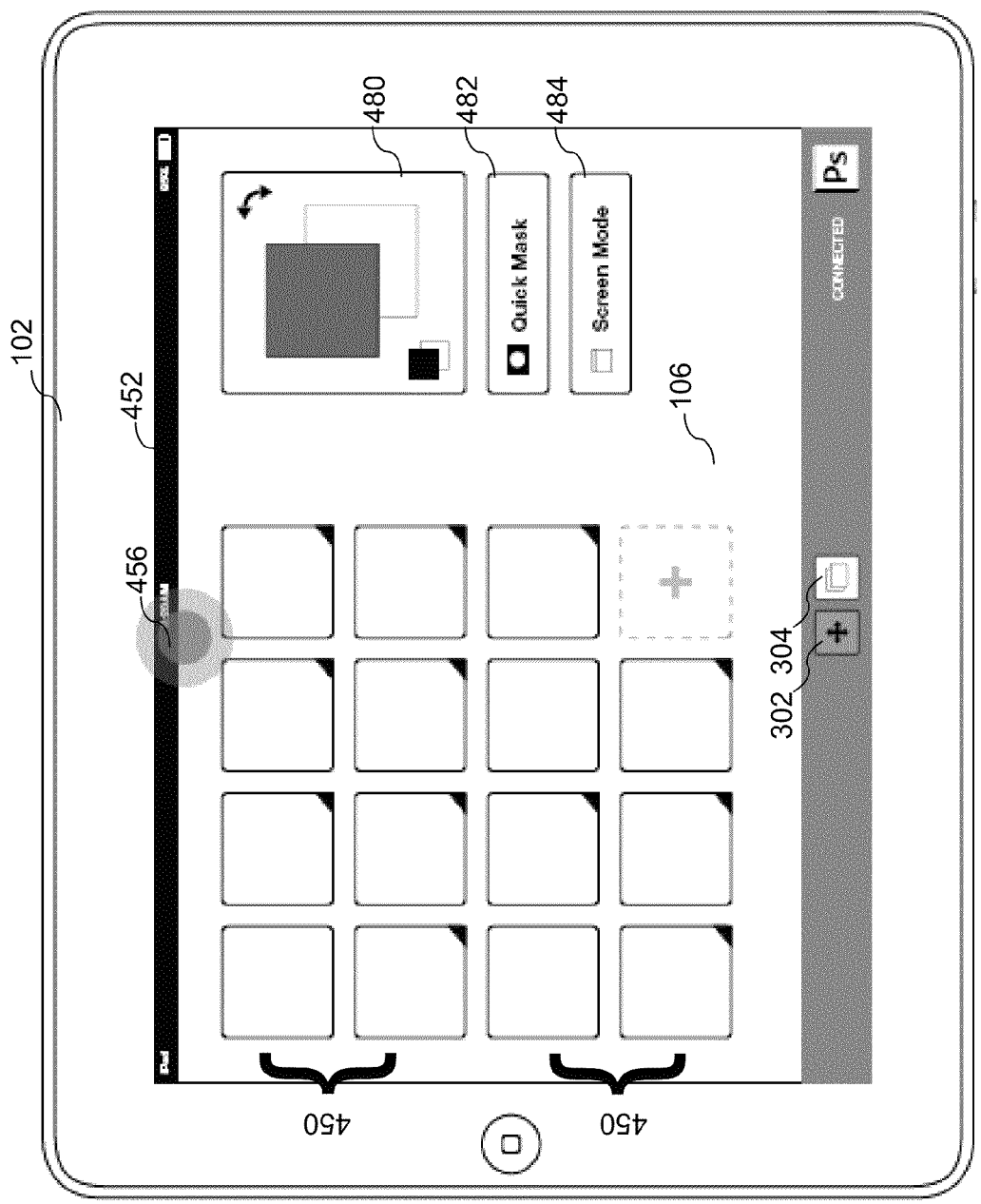
Figure 4D:
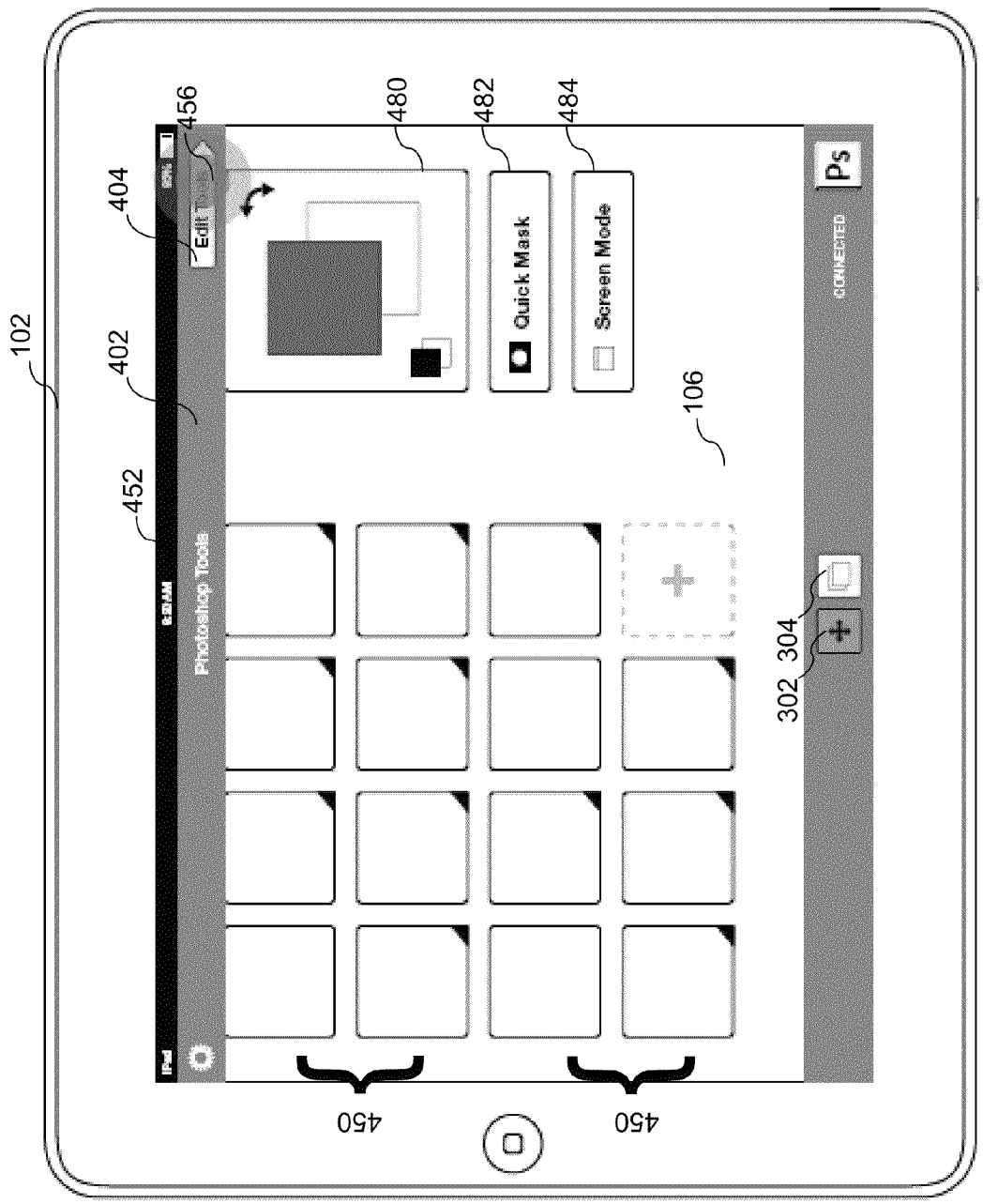

FIG. 4C illustrates an example of an invocation of a menu bar command. In one embodiment, a tap 456 on the status bar 452 or anywhere above the top row of tool icons invokes a menu bar 402 as illustrated in FIG. 4D. The menu bar 402 may have a variety of menu options. As an example, the menu bar 402 may have an edit tools button 404 that allows the user to navigate to display to edit tools for the content authoring program in the device 104 through the device 102. As another example, the menu bar 402 may have a settings button that allows the user to navigate to a settings display to edit settings.

Figure 4E:
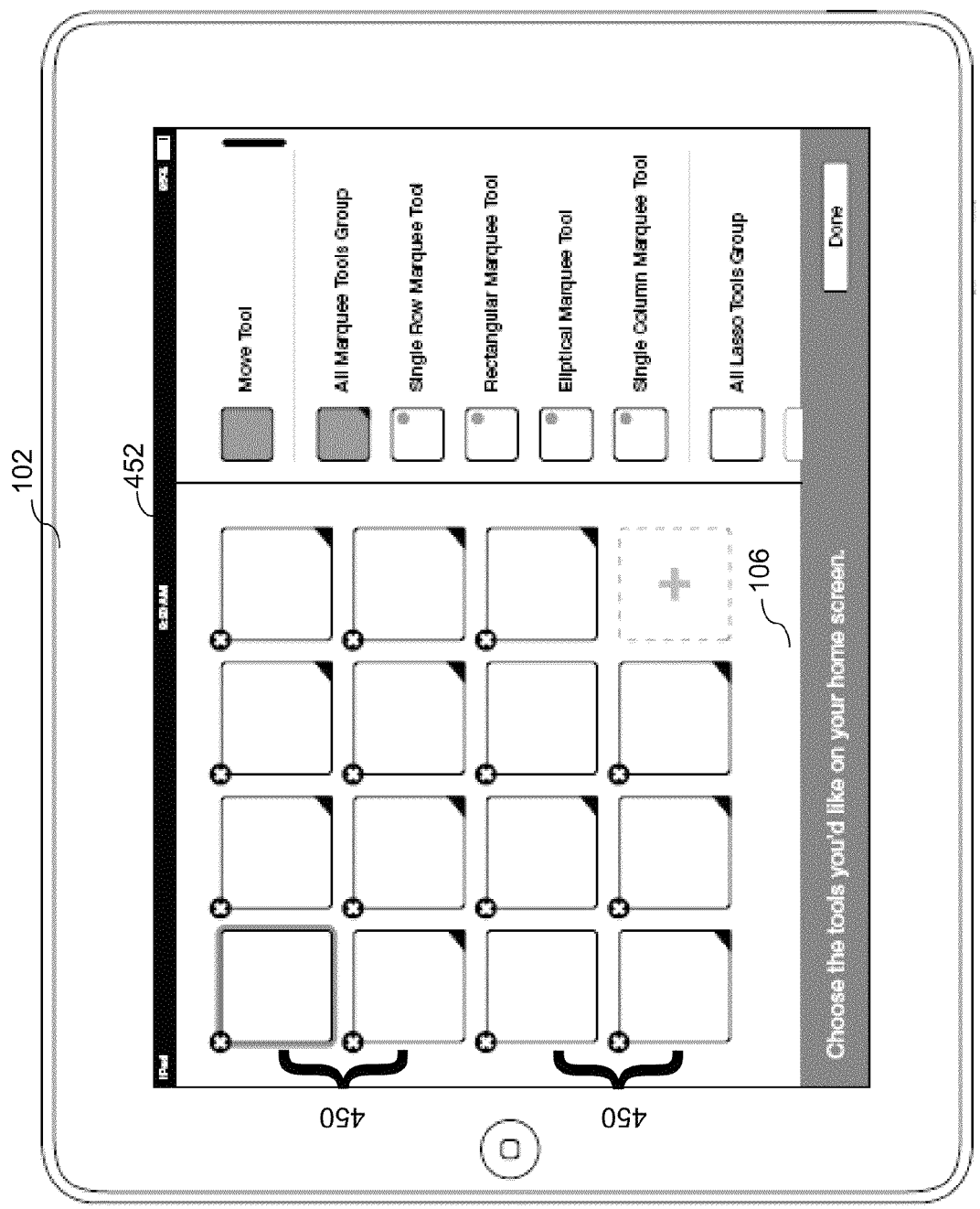
Figure 4F:
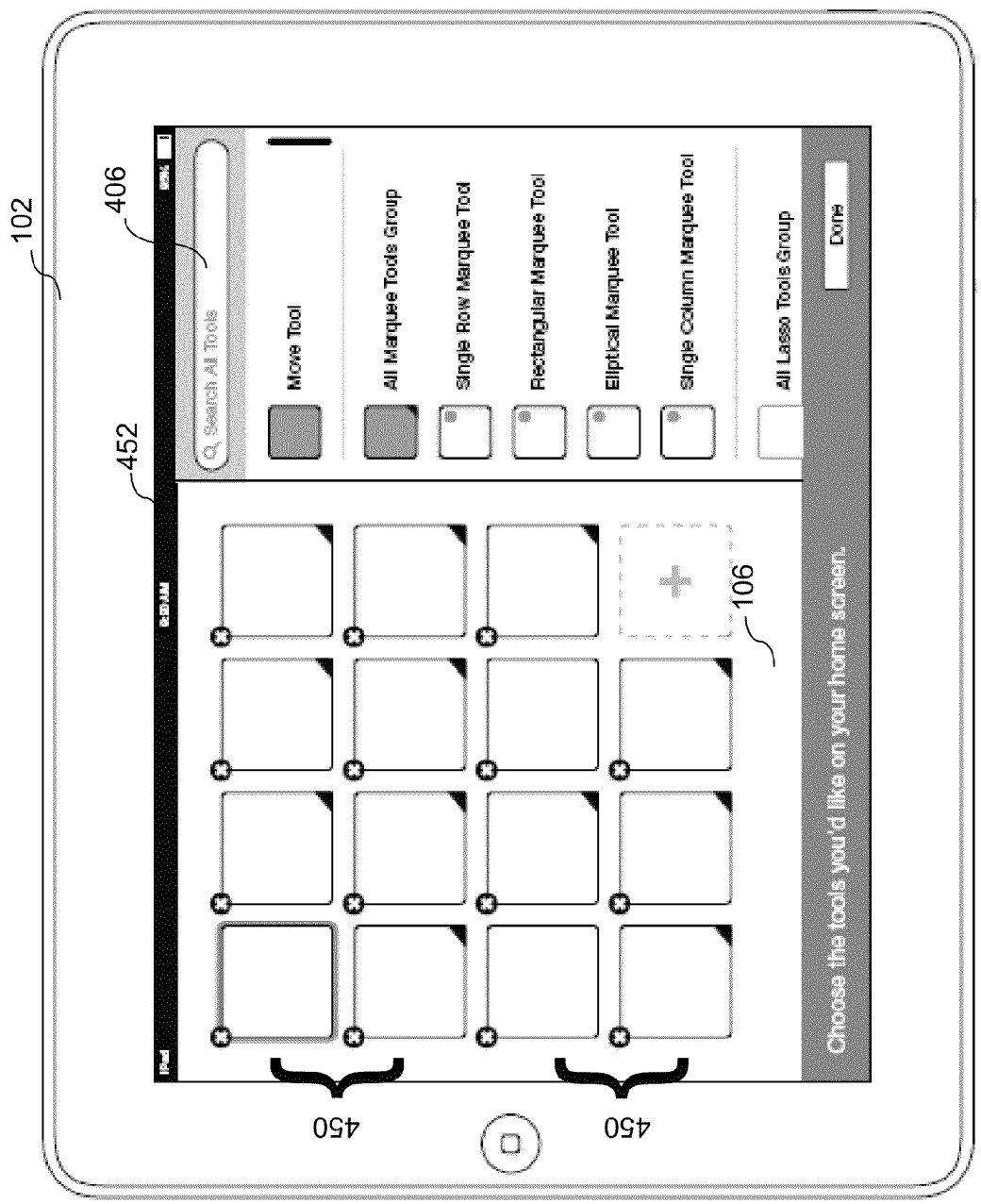
Figure 4G:
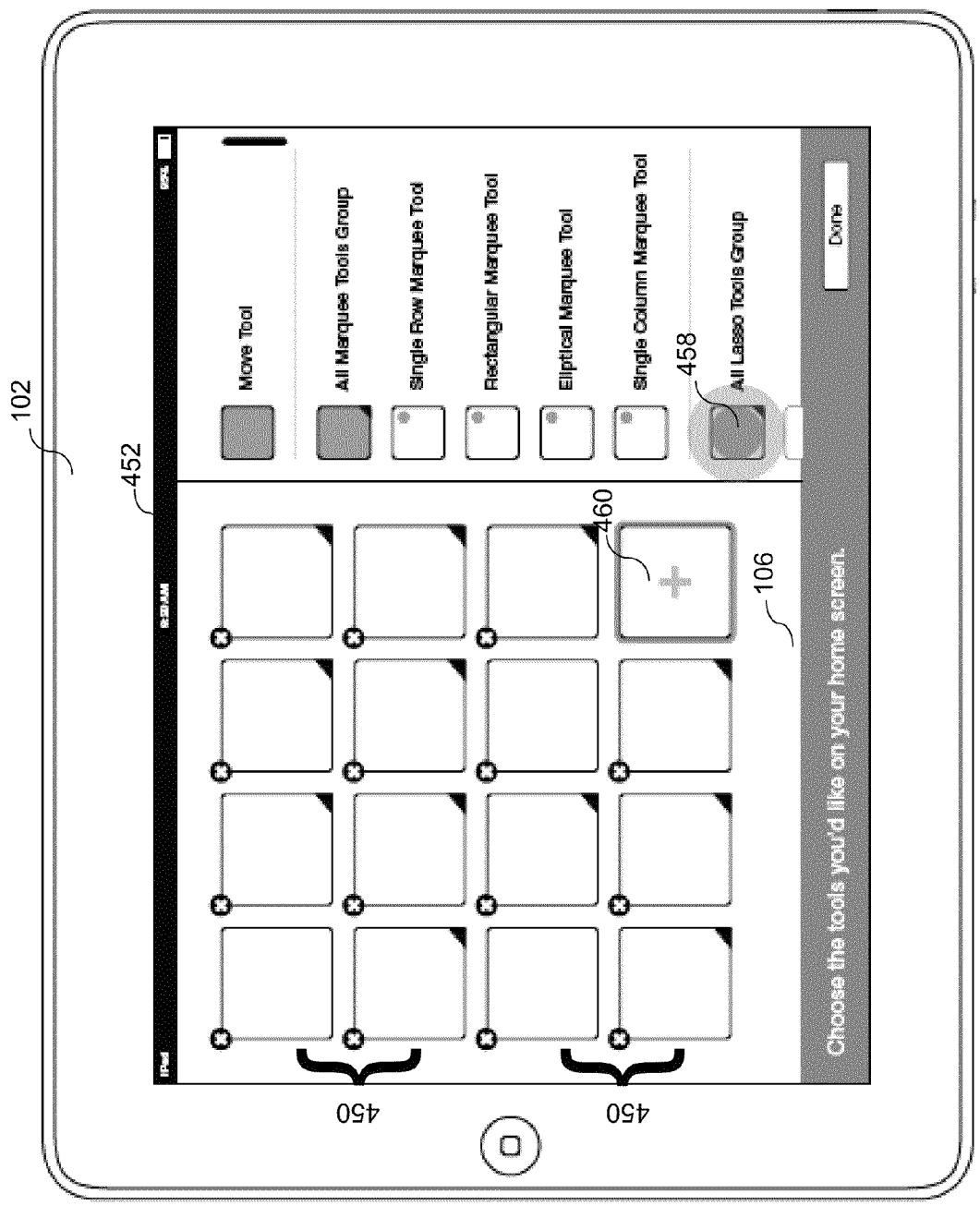
Figure 4H:
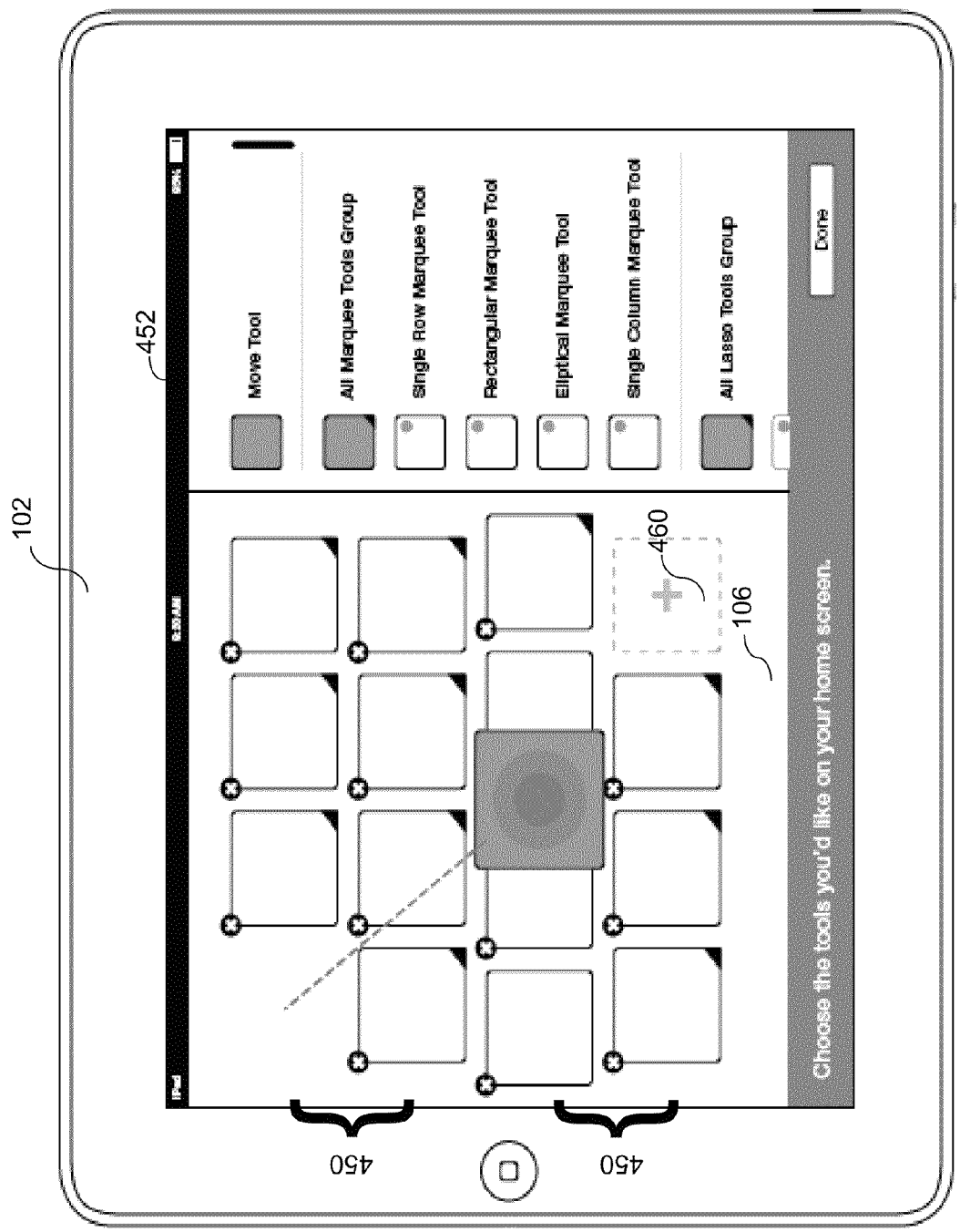

FIG. 4E illustrates an alternative display to that seen in FIG. 4C and FIG. 4D. As an example, instead of utilizing an edit tools button 404, the first device 102 may utilize a direct-manipulation approach. The tool location targets as well as how many spots are available are displayed in the first device GUI 106. FIG. 4F illustrates the display seen in FIG. 4E with a search interface 406 that allows a user to search through available tools. FIG. 4G illustrates an example of the display screen in FIG. 4E in which a tap input 458 is received to select a menu item for insertion into a selected empty space 460. Alternatively, the menu item may be dragged and dropped into the selected empty space 460. Further, FIG. 4H illustrates an example of the display screen in FIG. 4E in which reordering is performed by dragging and dropping a tool 450 to the empty space 460.

Figure 4I:
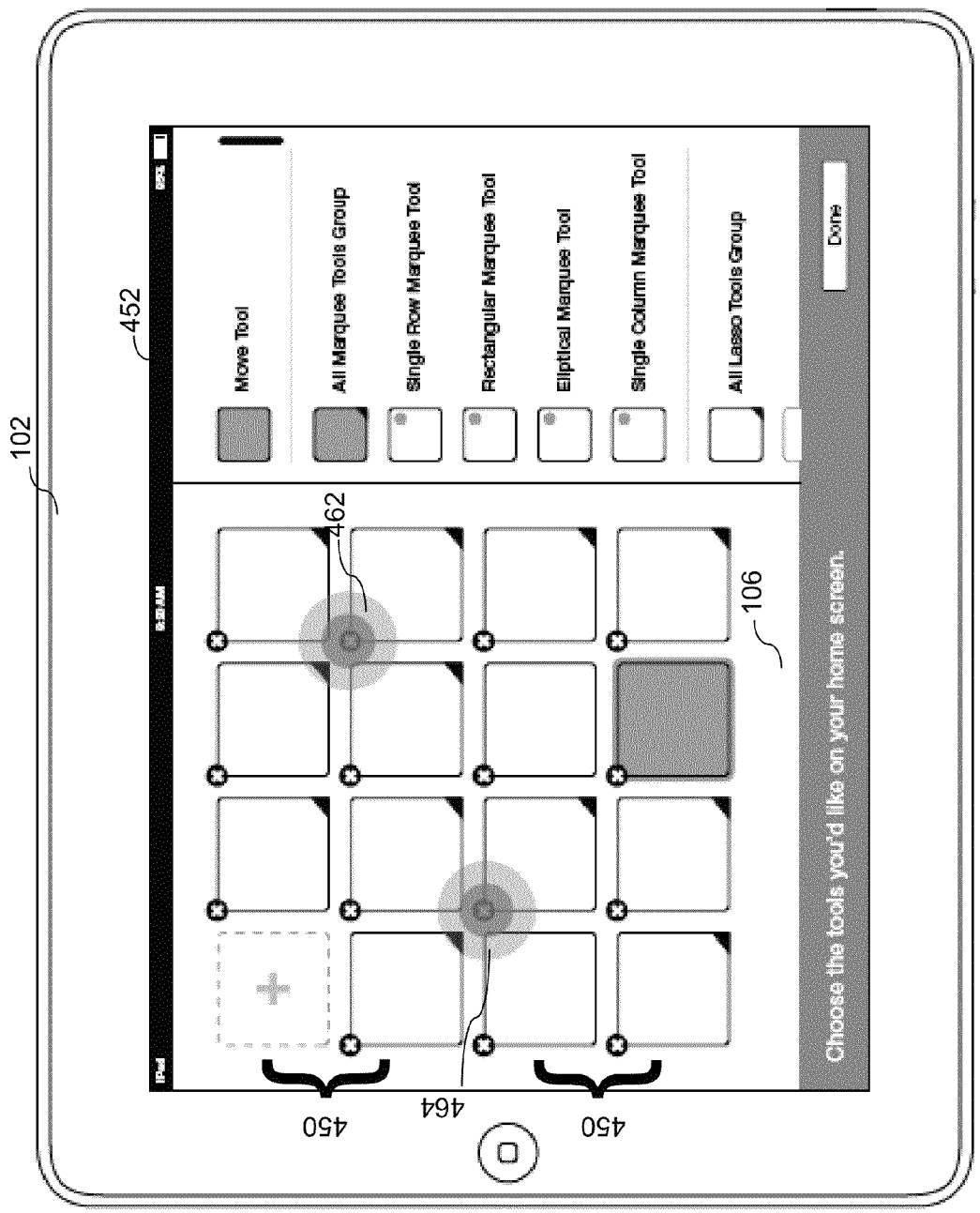

FIG. 4I illustrates non-contiguous tool management of the tool icons in the first device GUI 106. Non-contiguous tool management of the tool icons prevents repositioning of previous tool icons based on reposition of a subsequent icon. However, the tools subsequent to the repositioned icon are repositioned. As an example, if the tool 450 in the second row and third column is moved to the third row and third column, the icons in the first row and second row prior to the third column would not be repositioned, but the subsequent icons may be repositioned. In one embodiment, a first tap 462 and a second tap 464 may be utilized to perform the repositioning.

Figure 4J:
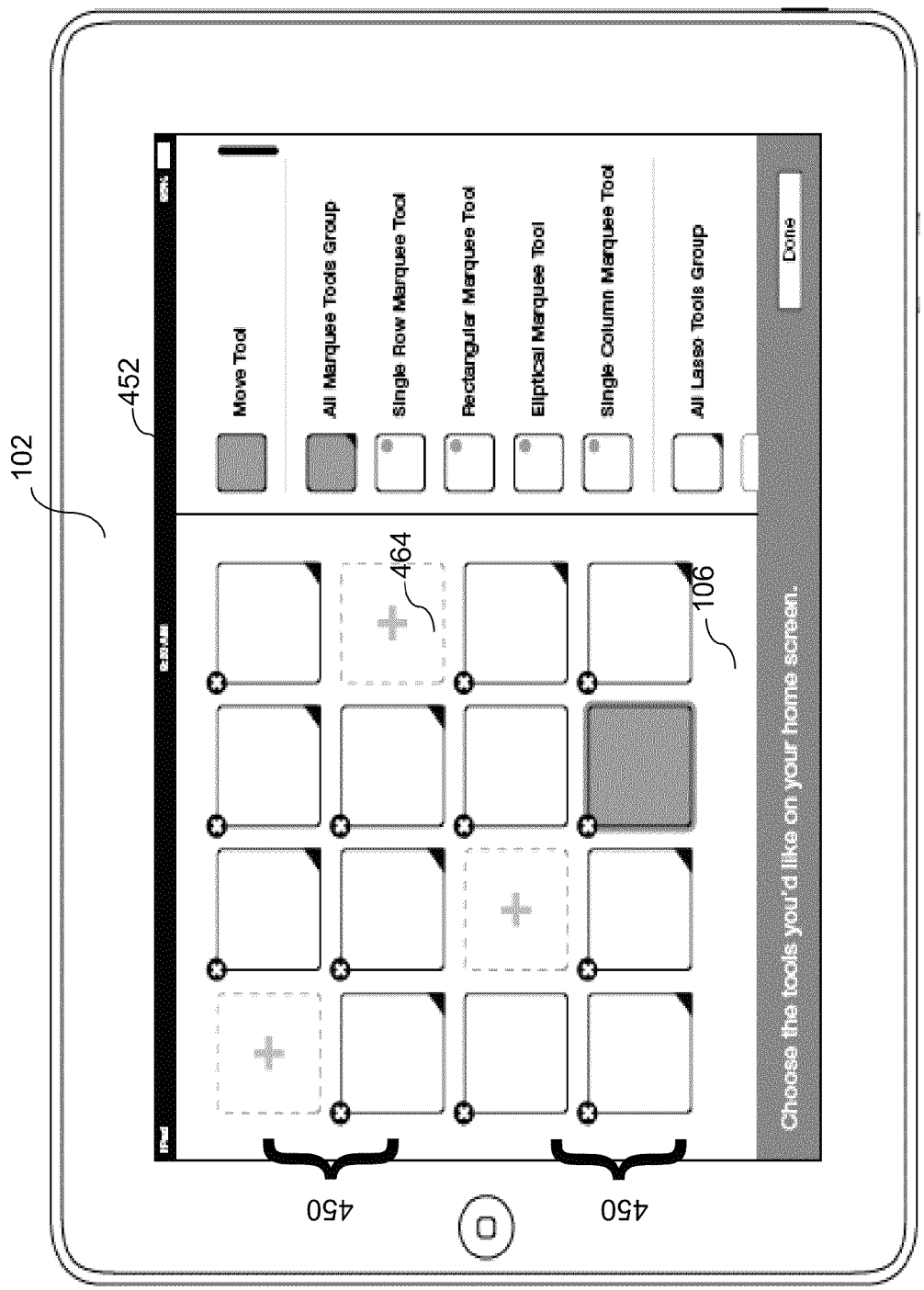

Further, FIG. 4J illustrates an example of a delete operation performed in the first device GUI 106. Deleting a tool simply leaves an available spot 464.

Figure 4K:
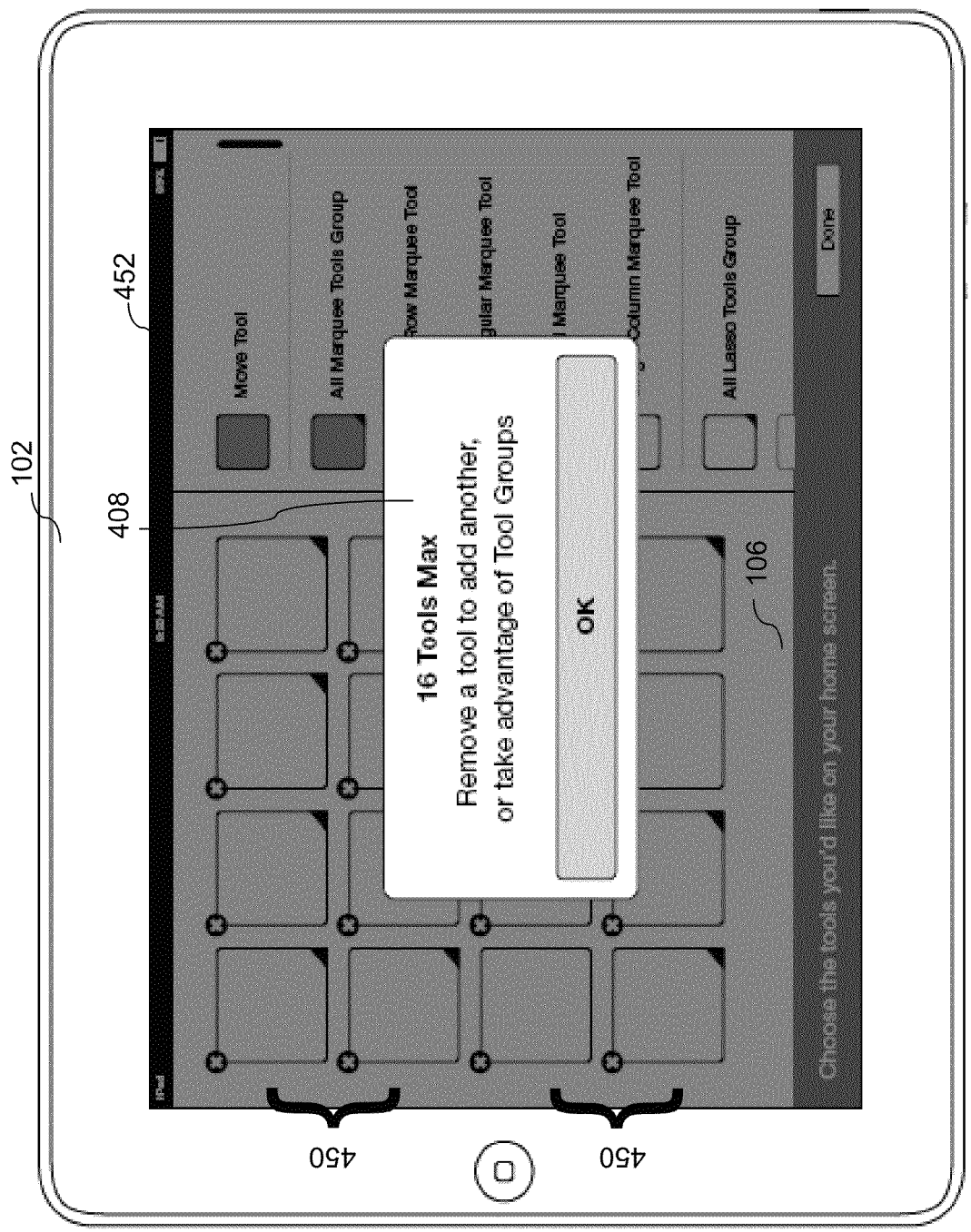

In addition, FIG. 4K illustrates an example of a dialog box 408 that is displayed in response to a user attempting to add an additional tool bar over the maximum. The dialog box 408 may also provide suggestions on how to utilize the tools.

Figure 4L:
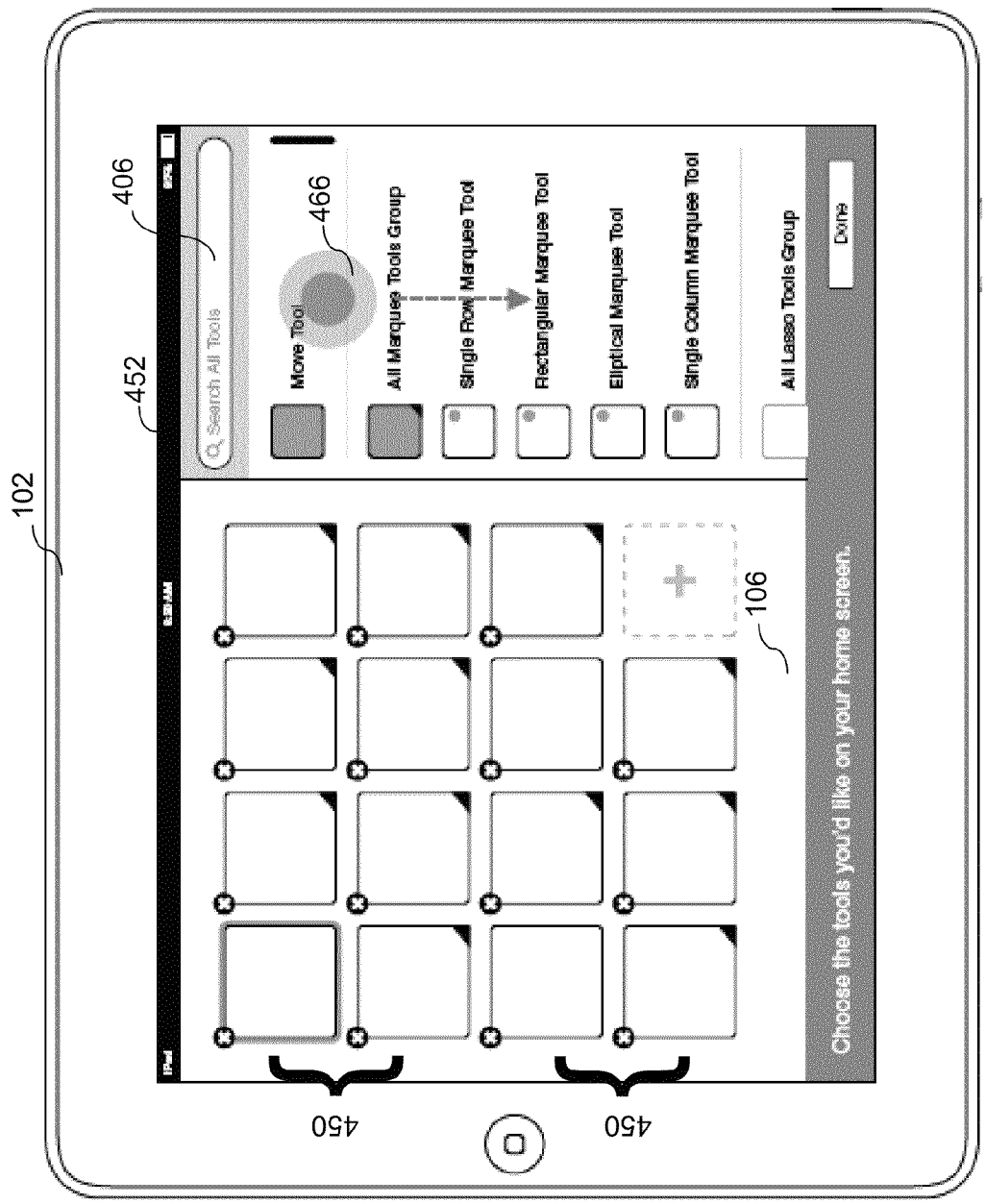

FIG. 4L illustrates an example of a pull down gesture 466 on a menu list in the first device GUI 106. As a result of the pull down gesture 466, the search interface 406, which is not persistent, is revealed.

Figure 4M:
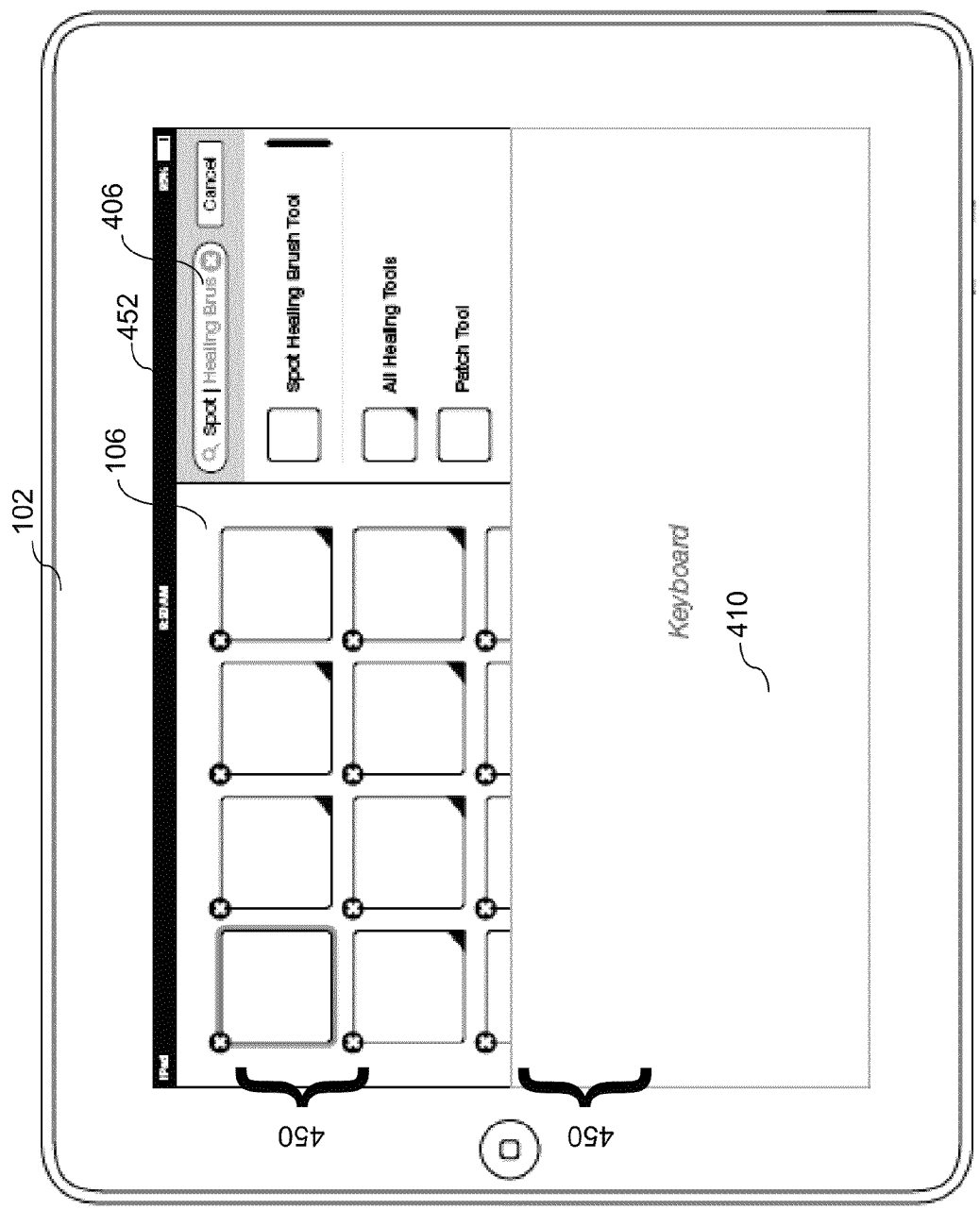

FIG. 4M illustrates a virtual keyboard 410 that may be utilized to interact with the search interface 406. In one embodiment, the search interface 406 is configured to be aware of keywords that are part of tool names. Further, an auto fill may be utilized. In one embodiment, related or suggested tools may also be displayed.

Any of the illustrations provided for in FIGS. 4A-4M may be viewed according to various orientations. For example, the positioning of the first device 102 may result in a landscape or a portrait view.

Figure 5A:
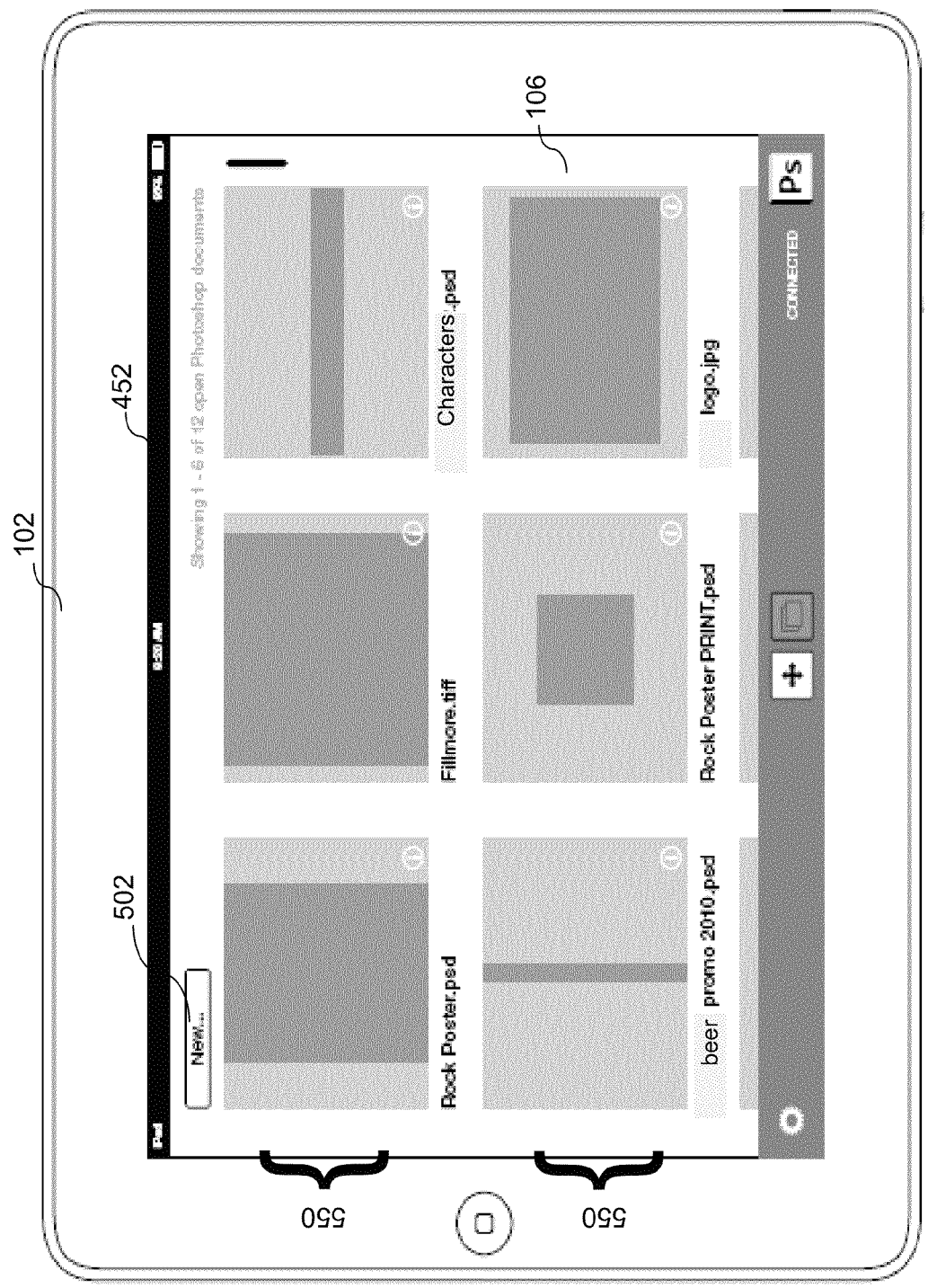
FIGS. 5A-5H illustrate example displays in the first device GUI of documents.

FIGS. 5A-5H illustrate example displays in the first device GUI 106 of documents. The first device 102 allows the user to control certain functionality on the second device 104. For example, the user may control the layout of documents displayed in the second device GUI 108 by interacting with the first device GUI 106. The user may send commands from the first device 102 to the second device 104. Further, the first device 102 may receive files and/or data associated with files. The files may be images, files containing text, or various other types of documents from the second device 104. For example, the first device 102 may request files and/or data associated with the files from the second device 104. The data associated with the files may include file properties such as file name, author, timestamp, pixel dimensions, width, height, resolution, color values, or the like. FIG. 5A illustrates a plurality of open documents 550, e.g., images that may be displayed for the user in the first GUI 106. In one embodiment, the documents are displayed in their true aspect ratio without cropping or distortion. Further, background footprint tiles may be utilized to unify the grid and bring order to the layout since the true aspect ratio may at times lead to an extreme aspect ratio. With respect to thumbnail images larger than a footprint tile, a scaling may be performed to make the thumbnail image smaller to fit the size of the tile to whichever edge is first reached by the thumbnail image. With respect to thumbnail images smaller than the footprint tile, those images are displayed in their actual pixel dimension. A new button 502 allows a user to create a new document in the first device 102 that may be utilized by the content authoring program in the second device 104.

Figure 5B:
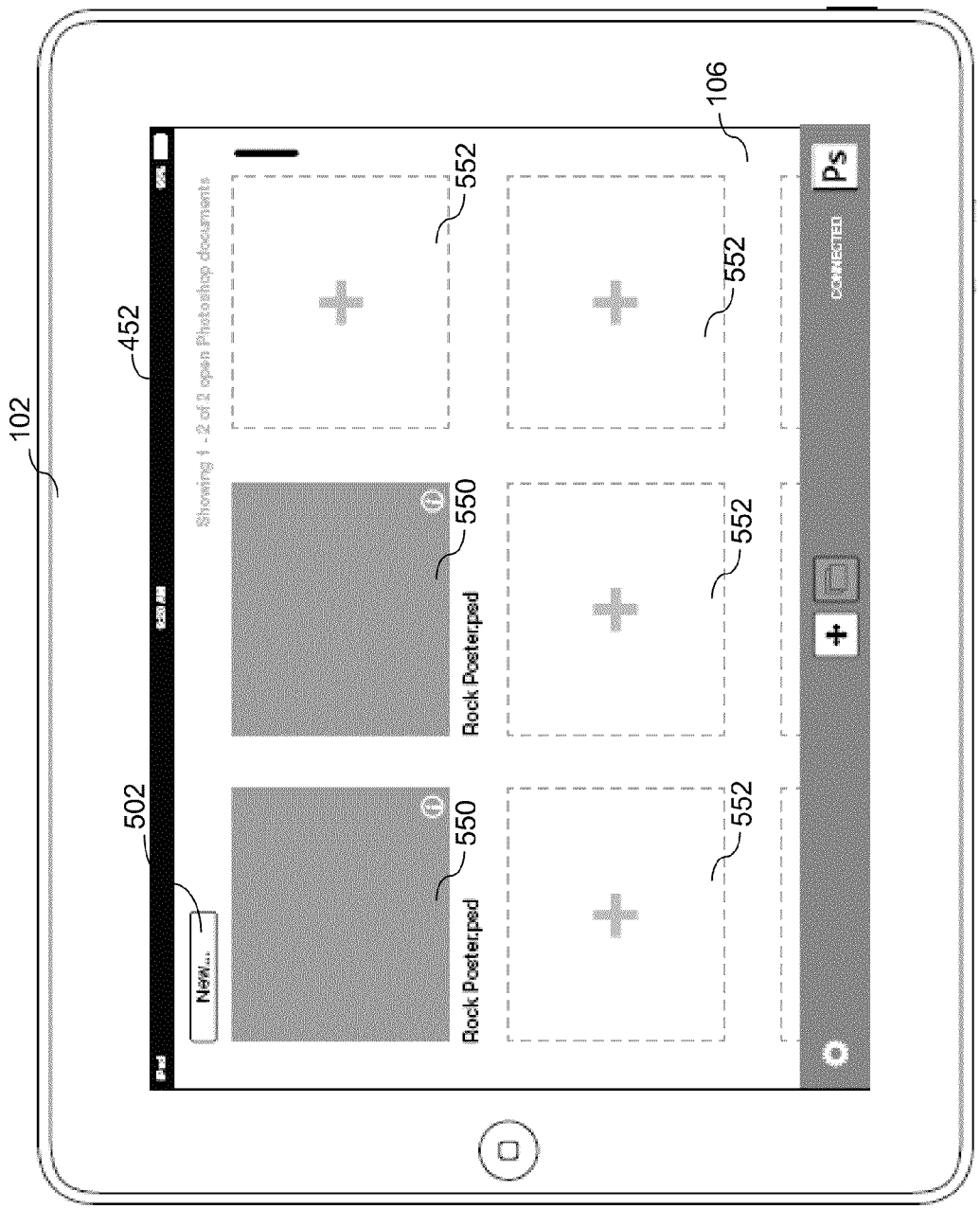

FIG. 5B illustrates an example in which two open documents 550 are displayed. For example, the two open documents 550 may be "Rock Poster.psd" and "Rock Poster.psd." The user may then create new documents in the available tile buttons 552.

Figure 5C:
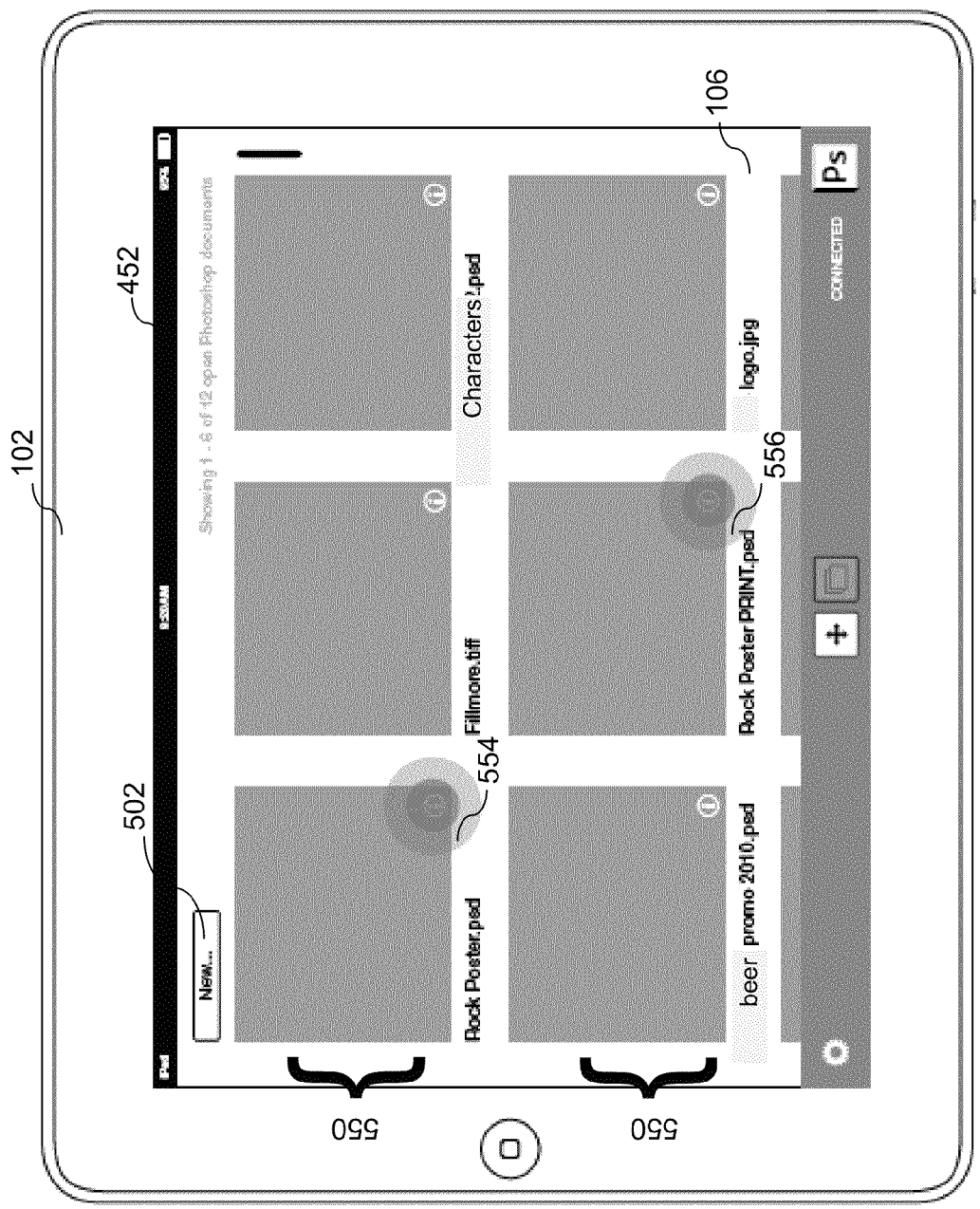
Figure 5D:
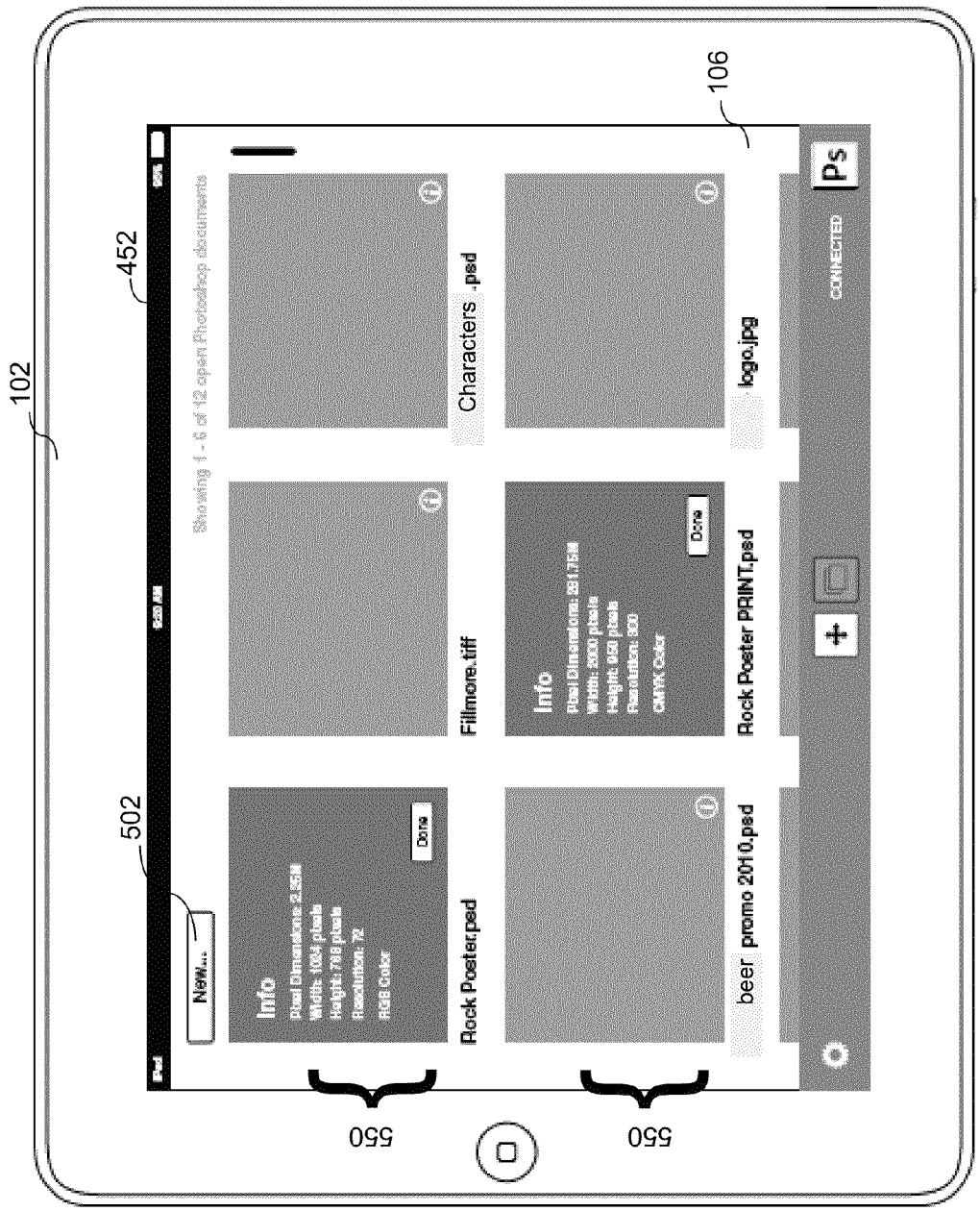

Further, FIG. 5C illustrates an example in which the user provides tap touch gestures over information icons. For example, the user may provide a first tap gesture 554 over an information indicator in the document "Rock Poster.psd" and a second tap gesture 556 over an information indicator in the document "Rock Poster PRINT.psd". As a result, FIG. 5D illustrates the tapped tiles displaying corresponding information. Document information for different documents may be viewed simultaneously.

Figure 5E:
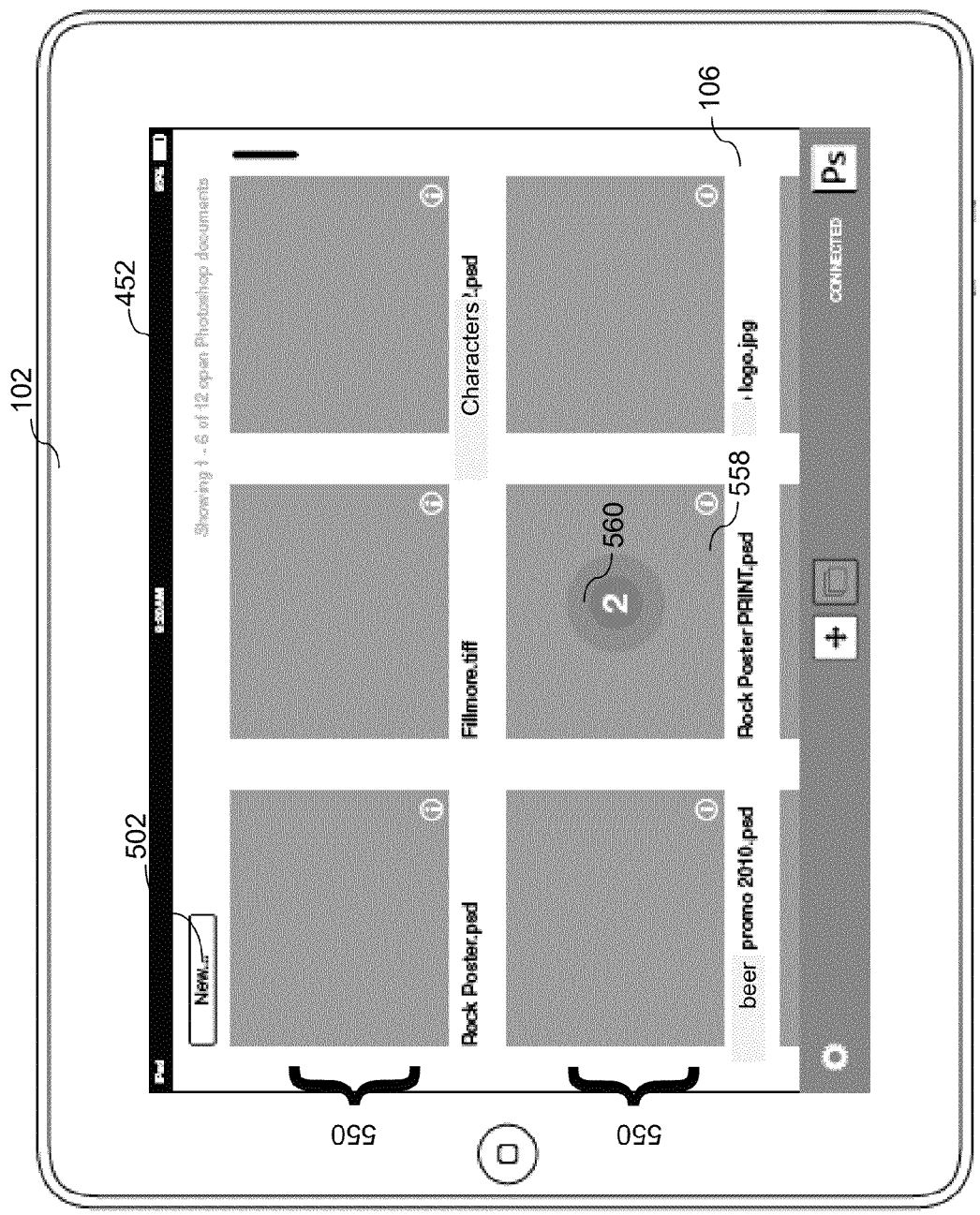

FIG. 5E illustrates a document 558 that is selected for zooming. In one embodiment, a single tap zooms the document on the second device GUI 108, but not on the first device GUI 106. In other words, the user may control the zooming of second device GUI 108 from the first device GUI 106. Alternatively, a double tap 560 or a pinch outward may be utilized to have a one up view of the document on the first device GUI 106. These touch gestures are simply provided as examples as a variety of touch gestures may be utilized.

In one embodiment, when the first device 102 is disconnected from the second device 104, the last state of the documents is cached. Various functionality such as one up view may be utilized with the first device 102 in disconnected mode. As a result, the first device 102 may be utilized as a presentation tool. When reconnected, the first device 102 will be updated to reflect the status of the documents in the second device 104. For example, if the first device 102 had two documents open prior to being disconnected and the second device 104 opened two more documents in the interim, the first device 102 will display the other two open documents after being reconnected. Any closed documents may also be updated. A determinate progress indicator may be utilized to indicate the progress of the updates. Further, a fade-out may be utilized during the update.

Figure 5F:
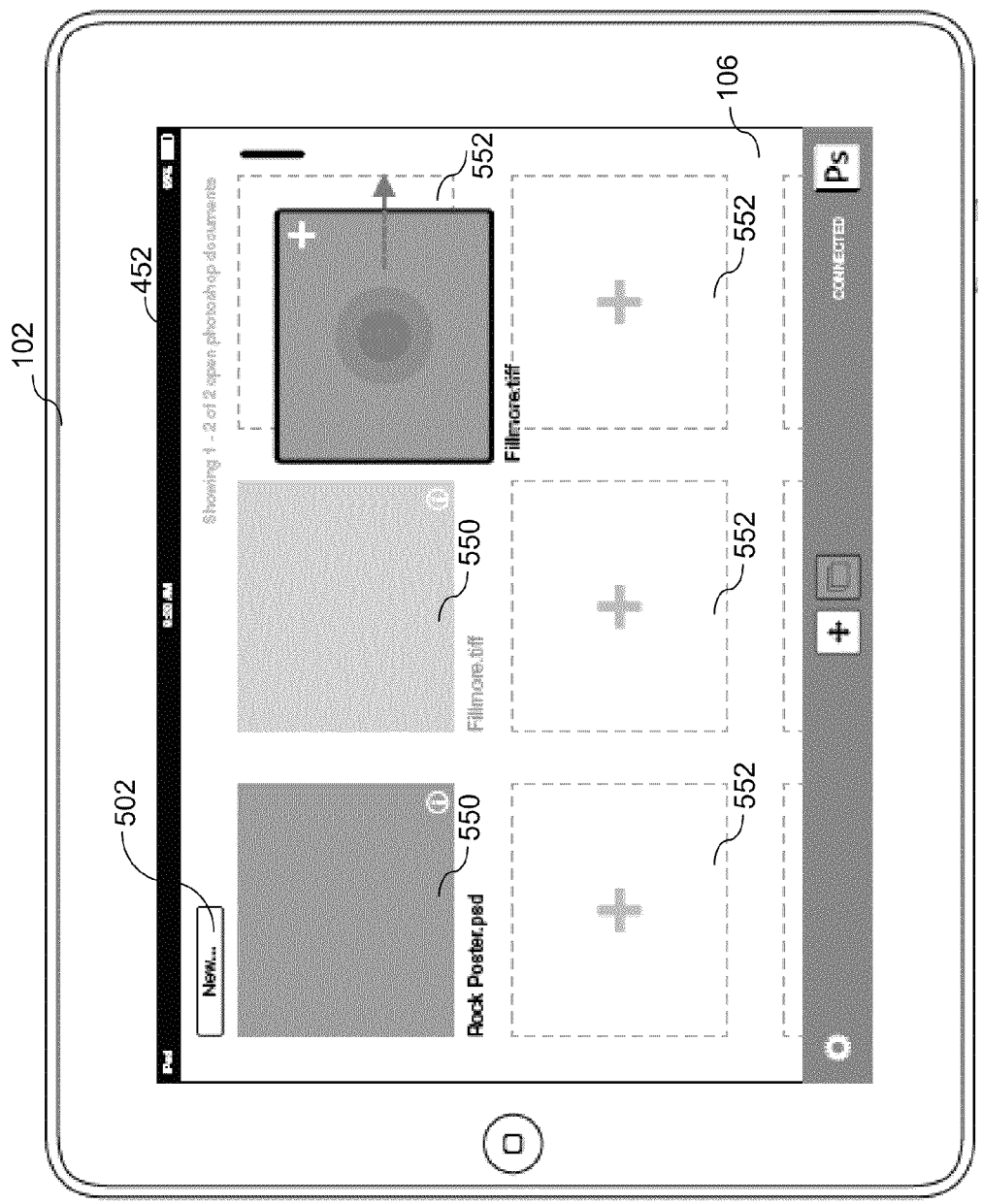
Figure 5G:
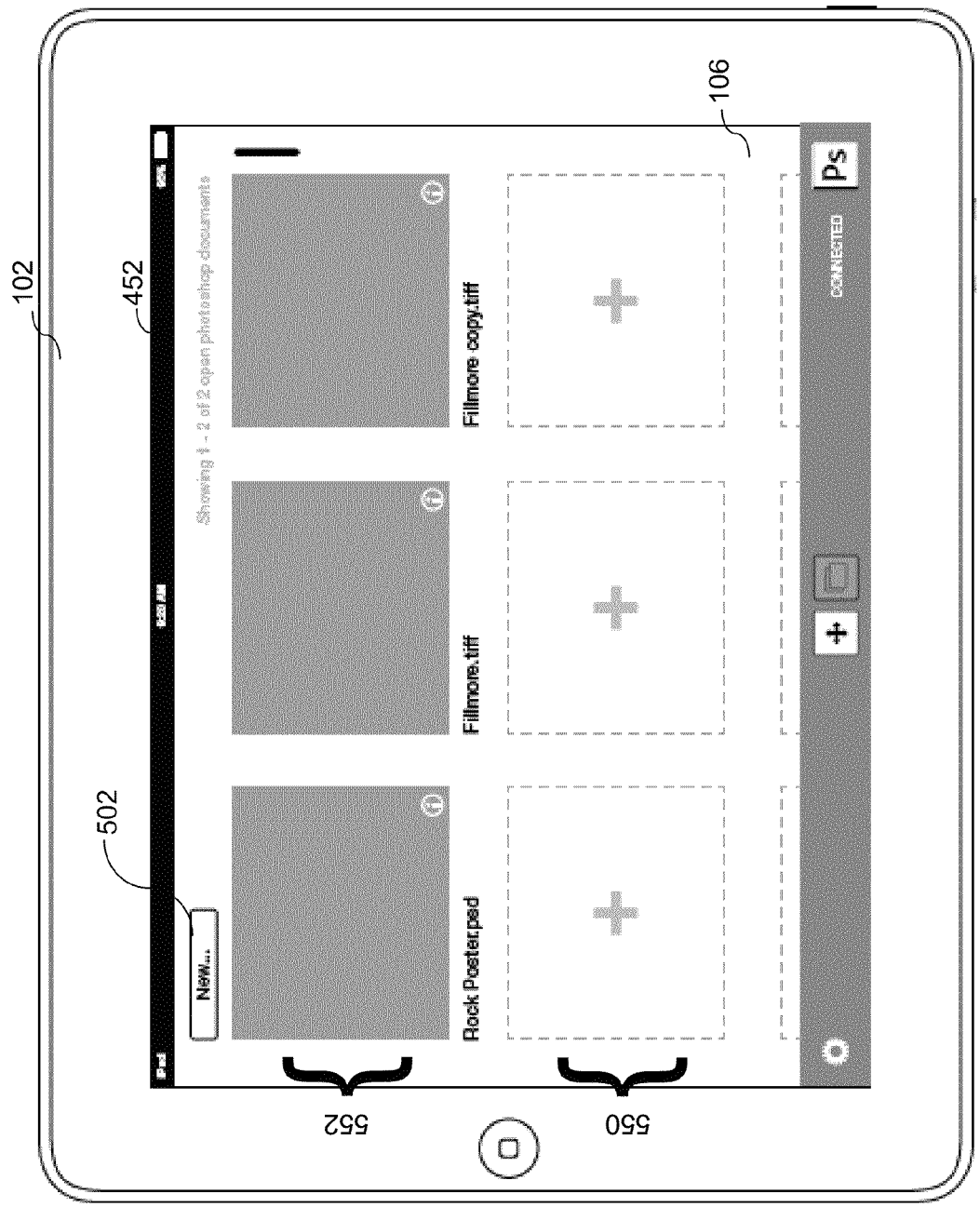

FIG. 5F illustrates duplication of an open document 450. In one embodiment, a user may duplicate an open document 450 by dragging and dropping the open document 450 to an empty target. FIG. 5G illustrates the copied document in the now occupied target.

Figure 5H:
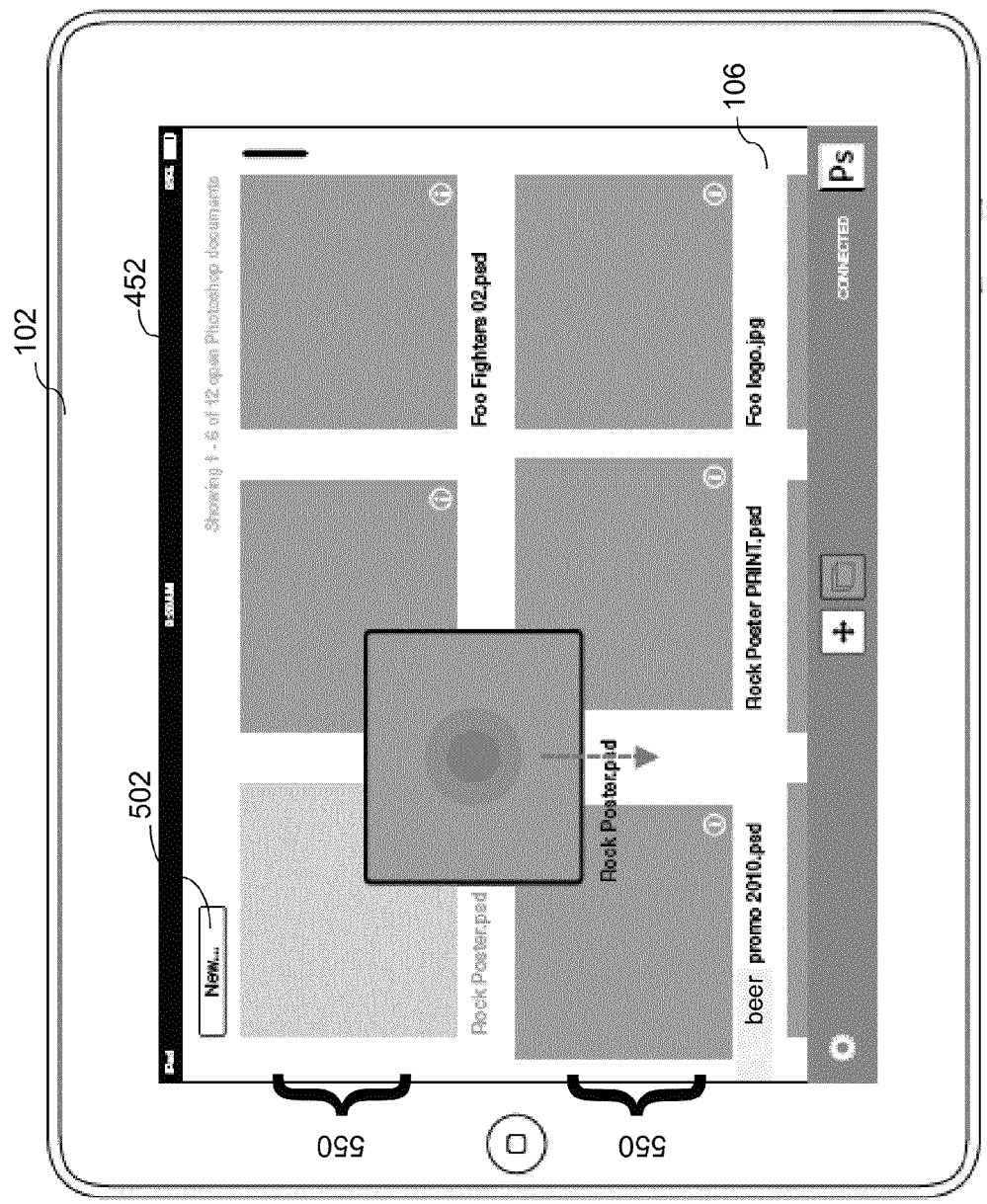

FIG. 5H illustrates a reordering of the documents in the first device GUI 106. In one embodiment, the user drags and drops documents to different positions to reorder the document. In another embodiment, the reordering is performed only on the first device GUI 106 without any effect on the second device GUI 108. In yet another embodiment, the reordering on the first device GUI 106 also reorders the second device GUI 108.

Figure 6:
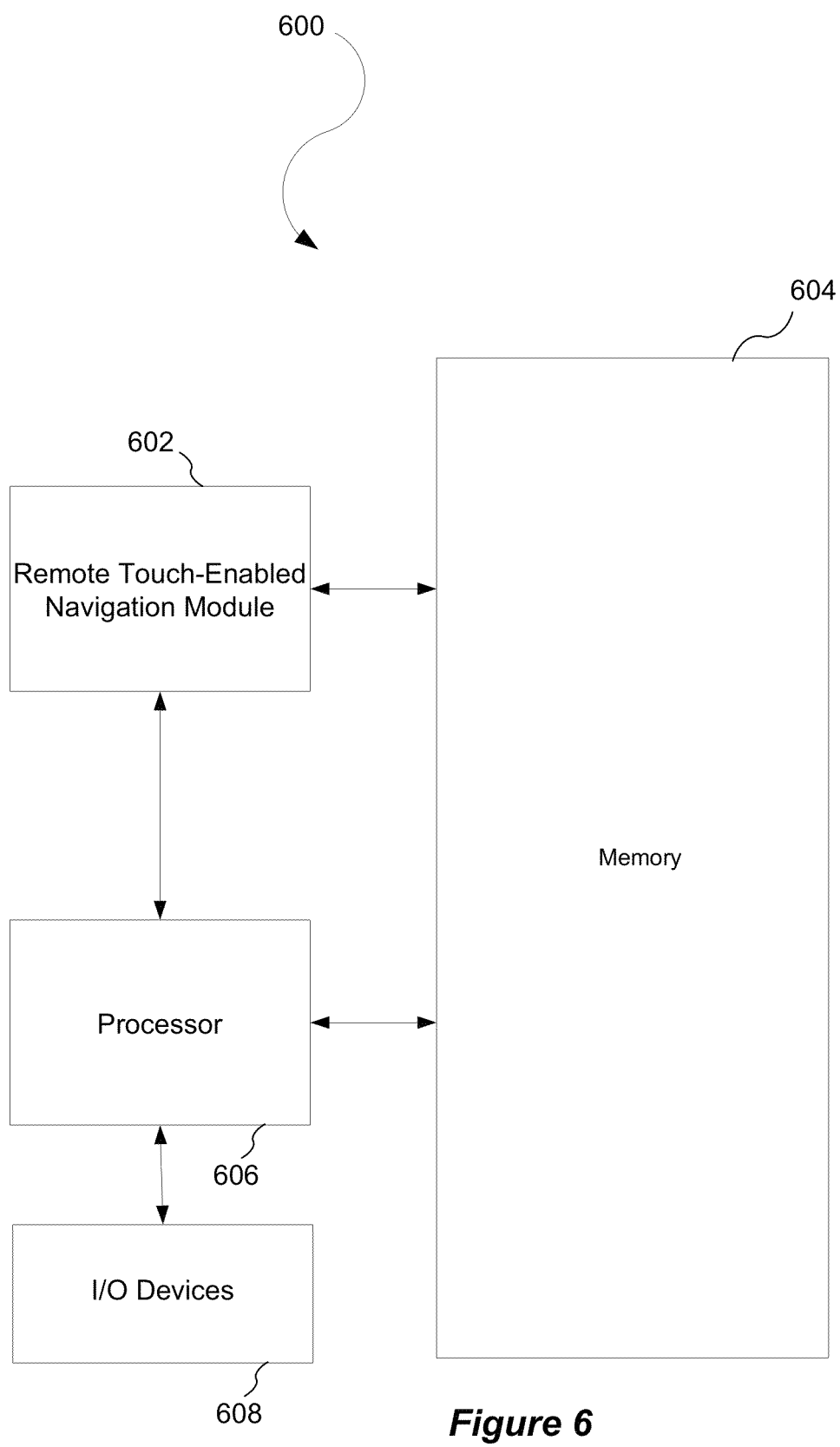
FIG. 6 illustrates a system configuration that may be utilized for remote touch-enabled navigation.

FIG. 6 illustrates a system configuration 600 that may be utilized for remote touch-enabled navigation. In one embodiment, a remote touch-enabled navigation device 602 interacts with a memory 604. In one embodiment, the system configuration 600 is suitable for storing and/or executing program code and is implemented using a general purpose computer or any other hardware equivalents. The processor 606 is coupled, either directly or indirectly, to the memory 604 through a system bus. The memory 604 can include local memory employed during actual execution of the program code, bulk storage, and/or cache memories which provide temporary storage of at least some program code in order to reduce the number of times code must be retrieved from bulk storage during execution.

The Input/Output ("I/O") devices 608 can be coupled directly to the system configuration 600 or through intervening input/output controllers. Further, the I/O devices 608 may include a keyboard, a keypad, a mouse, a microphone for capturing speech commands, a pointing device, and other user input devices that will be recognized by one of ordinary skill in the art. Further, the I/O devices 608 may include output devices such as a printer, display screen, or the like. Further, the I/O devices 608 may include a receiver, transmitter, speaker, display, image capture sensor, biometric sensor, etc. In addition, the I/O devices 608 may include storage devices such as a tape drive, floppy drive, hard disk drive, compact disk ("CD") drive, etc. Any of the modules described herein may be single monolithic modules or modules with functionality distributed in a cloud computing infrastructure utilizing parallel and/or pipeline processing.

Network adapters may also be coupled to the system configuration 600 to enable the system configuration 600 to become coupled to other systems, remote printers, or storage devices through intervening private or public networks. Modems, cable modems, and Ethernet cards are just a few of the currently available types of network adapters.

The processes described herein may be implemented in a general, multi-purpose or single purpose processor. Such a processor will execute instructions, either at the assembly, compiled or machine-level, to perform the processes. Those instructions can be written by one of ordinary skill in the art following the description of the figures corresponding to the processes and stored or transmitted on a computer readable medium. The instructions may also be created using source code or any other known computer-aided design tool. A computer readable medium may be any medium capable of carrying those instructions and include a CD-ROM, DVD, magnetic or other optical disc, tape, silicon memory (e.g., removable, non-removable, volatile or non-volatile), packetized or non-packetized data through wireline or wireless transmissions locally or remotely through a network. A computer is herein intended to include any device that has a general, multi-purpose or single purpose processor as described above.

It should be understood that the processes and systems described herein can take the form of entirely hardware embodiments, entirely software embodiments, or embodiments containing both hardware and software elements. If software is utilized to implement the method or system, the software can include but is not limited to firmware, resident software, microcode, etc.

It is understood that the processes and systems described herein may also be applied in other types of processes and systems. Those skilled in the art will appreciate that the various adaptations and modifications of the embodiments of the processes and systems described herein may be configured without departing from the scope and spirit of the present processes, systems, and computer program products. Therefore, it is to be understood that, within the scope of the appended claims, the present processes, systems, and computer program products may be practiced other than as specifically described herein.

We claim:

1. A computer program product comprising a non-transitory computer useable storage device having a computer readable program that, responsive to execution on a touch-enabled device having a touch-enabled display device that is viewable by a user, causes the touch-enabled device to:

establish, from the touch-enabled device, a two-way connection with a computing device through a network, the computing device having a display device that is viewable by the user and a content authoring program stored therein that is configured to modify content, the display device of the computing device being different from the touch-enabled display device of the touch-enabled device;

receive, at the touch-enabled device, content from the content authoring program;

display, at the touch-enabled device, the content received from the content authoring program;

recognize, by the touch-enabled device, a disconnection of the two-way connection;

receive, at the touch-enabled device and from the user of the touch-enabled device, an input as part of user interaction editing the content received from the content authoring program; and responsive to re-establishing the two-way connection at the touch-enabled device, send, from the touch-enabled device, the edited content to the content authoring program on the computing device such that the content authoring program is updated with the edited content, the updating enabling continuation of the user interaction with the content authoring program through the computing device.

2. The method of claim 1, wherein the input editing the content received from the content authoring program is a touch gesture received at the touch-enabled device.

3. A method comprising:

establishing, from a touch-enabled device, a two-way connection with a computing device through a network, the touch-enabled device having a touch-enabled display that is viewable by a user and displaying a first graphical user interface, the computing device having a display that is viewable by the user and displaying a second graphical user interface and a content authoring program stored therein that is configured to modify the content, the display of the computing device being different from the touch-enabled display of the touch-enabled device;

displaying, at the touch-enabled device and in the first graphical user interface, a navigation menu;

receiving, at the touch-enabled device, an input as part of user interaction indicating a selection from within the navigation menu;

sending, from the touch-enabled device, the selection to the content authoring program on the computing device; and causing the content authoring program on the computing device to display an indication of the selection in the second graphical user interface, the displayed indication enabling continuation of the user interaction with the content authoring program through the second graphical user interface.

4. The method of claim 3, wherein the selection from within the navigation menu is a command selected to be performed by the content authoring program.

5. The method of claim 4, wherein the command is selected from a command to change a color in the content authoring program, a command to change a tool in a toolbar in the content authoring program, or a command to select an image in the content authoring program.

6. The method of claim 4, further comprising receiving a result of the command performed by the content authoring program through the network.

7. The method of claim 6, further comprising caching the result such that the touch-enabled device retains the result if the two-way connection is disconnected.

8. The method of claim 3, wherein the selection from within the navigation menu is a selection to zoom in on a document, and the indication of the selection displayed in the second graphical user interface is a display of the zoomed-in document.

9. The method of claim 3, wherein the selection from within the navigation menu is a selection to change the layout of a set of documents, and the indication of the selection displayed in the second graphical user interface is a display of the documents in the changed layout.

10. The system of claim 3, wherein the selection from within the navigation menu is a selection to create a new document, and the indication of the selection displayed in the second graphical user interface is a display of the new document.

11. A system comprising:

an establishment module that establishes, from a touch-enabled device having a touch-enabled display that is viewable by a user, a two-way connection with a computing device through a network, the computing device having a display that is viewable by the user and a content authoring program stored therein that is configured to modify content, the display of the computing device being different from the touch-enabled display of the touch-enabled device;

a graphical user interface that displays, on the touch-enabled display of the touch-enabled device that is viewable by the user, a navigation menu, the navigation menu containing tools to be utilized for content authoring in the content authoring program on the computing device;

an input module that receives, at the touch-enabled device, a first input as part of user interaction customizing the navigation menu containing tools and a second input as part of the user interaction indicating a selected tool from the navigation menu;

a transmission module that sends, from the touch-enabled device, the selected tool to the computing device, the sending enabling continuation of the user interaction with the content authoring program via utilization of the selected tool to modify the content using the content authoring program on the computing device; and a reception module that receives, at the touch-enabled device from the computing device, an indication that the selected tool is being utilized by the content authoring program on the computing device.

12. The system of claim 11, wherein the first input customizing the navigation menu is a drag and drop touch gesture at the touch-enabled device.

13. The system of claim 11, wherein the first input customizing the navigation menu adds a tool to the navigation menu, deletes a tool from the navigation menu, or reorders tools displayed in the navigation menu.

14. The system of claim 11, wherein the selected tool is a command that is performed by the content authoring program.

15. The system of claim 14, wherein the command is a command to change a color in the content authoring program, a command to change a tool in a toolbar in the content authoring program, or a command to select an image in the content authoring program.

16. The system of claim 15, wherein the reception module also receives a result of the command performed by the content authoring program through the network.

17. The system of claim 11, wherein the selected tool is utilized through a graphical user interface that is displayed at the computing device by the content authoring program.

* * * * *